United States Patent [19]

Hester et al.

[11] 4,354,101
[45] Oct. 12, 1982

[54] METHOD AND APPARATUS FOR READING AND DECODING A HIGH DENSITY LINEAR BAR CODE

[75] Inventors: Gerald P. Hester, Santa Ana; Paul Sherer, Costa Mesa, both of Calif.

[73] Assignee: MSI Data Corporation, Costa Mesa, Calif.

[21] Appl. No.: 142,776

[22] Filed: Apr. 22, 1980

Related U.S. Application Data

[63] Continuation of Ser. No. 13,804, Feb. 21, 1979, which is a continuation of Ser. No. 787,855, Apr. 15, 1977, abandoned.

[51] Int. Cl.³ .............................................. G06K 7/10
[52] U.S. Cl. .................................. 235/463; 235/466; 235/472
[58] Field of Search ............... 235/454, 462, 463, 466, 235/472

[56] References Cited

U.S. PATENT DOCUMENTS 3,916,154 10/1975 Hare ................................... 235/463

FOREIGN PATENT DOCUMENTS 1397995 6/1975 United Kingdom .
1390404 8/1975 United Kingdom .

OTHER PUBLICATIONS

"Optical Scanner Compensation for Bar Codes"-by Pujdowski et al., IBM TDB, vol. 17, #3, 8/74.

Primary Examiner—Vincent P. Canney
Attorney, Agent, or Firm—Edward J. DaRin

[57] ABSTRACT

A method and apparatus for decoding a high density linear bar code of the type of the Universal Product Code (UPC) symbol and derivatives thereof. The method comprehends unambiguously decoding the encoded characters of the symbol by the use of primary ratios representative of the ratios of the sum of the widths of selected coding modules and secondary decoding ratios. The secondary ratios are selected in the event of any out-of-tolerance printing of the symbol for permitting the secondary ratios to be utilized with the primary ratios for resolving any possible ambiguities. The method and apparatus is applicable to scanning the UPC symbol by means of a hand-held wand as well as laser beam scanning. The apparatus contemplates the measuring of the widths of the coding modules and storing the width measurements in a memory without decoding. Since the symbol includes a standard pattern having known module-to-module width ratios, this information is utilized for processing the stored data to locate the measurement data in the memory, compute the printing tolerance character and then compute the desired ratios for decoding the scanned symbol.

60 Claims, 10 Drawing Figures

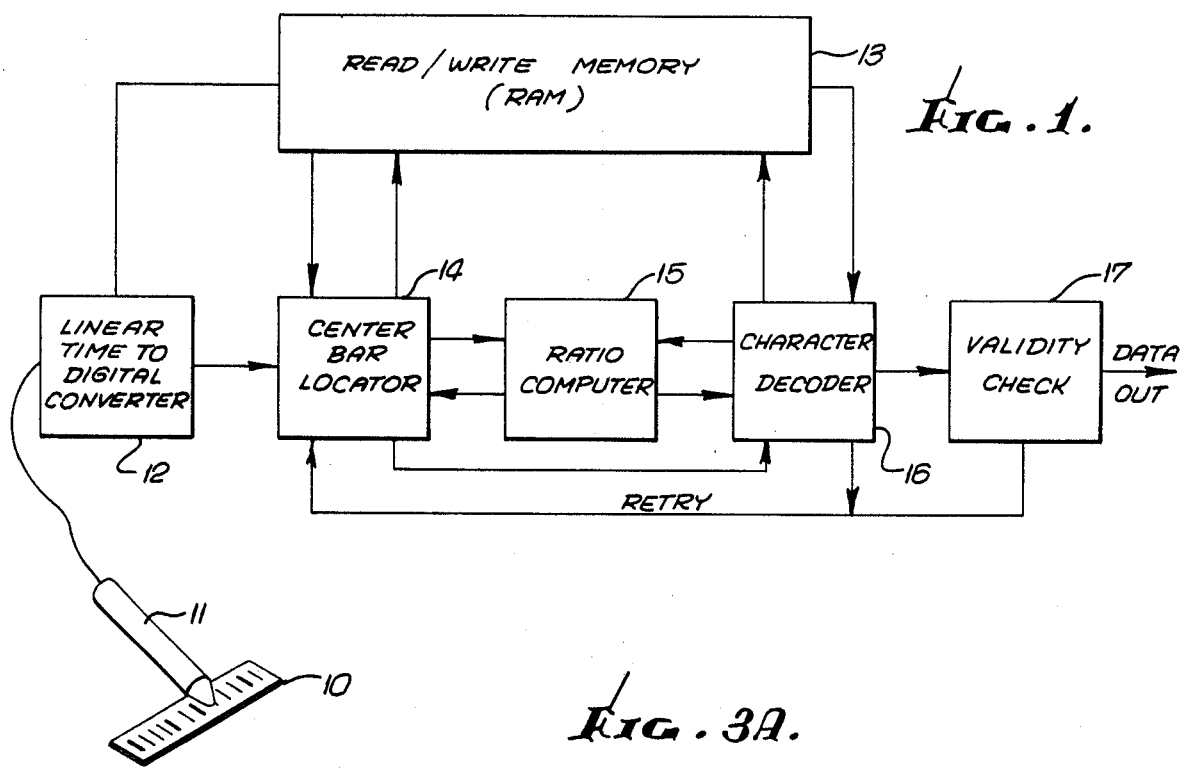
FIG. 1.
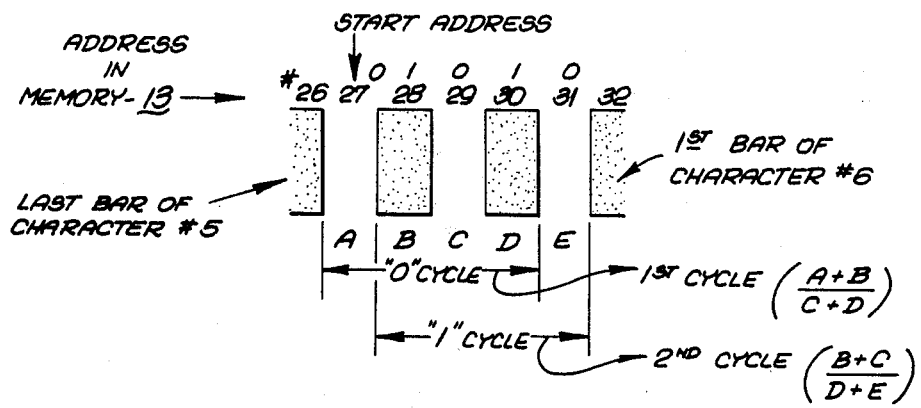
FIG. 3A.
FIG. 3B.
CENTER BAR READ ONLY MEMORY (ROM) - "E"
| ROM-E ADDRESS (LOG OF RATIO) | DATA | RESULTING RATIO |
|---|---|---|
| 0 - 1 | 1 | 1 |
| 2 - 14 | 0 | NOT EQUAL TO 1 |
| 15 | 1 | 1 |

TWO PRIMARY DECODING RATIOS:

① $\dfrac{A+B}{C+D}$ ; ② $\dfrac{A+D}{B+C}$  } 2/5, 3/4, 4/3, 5/2 (RESULTING RATIOS)

IF TWO PRIMARY RATIOS ARE 3/4, 4/3 OR 4/3, 3/4 USE SECONDARY (AMBIGUITY) DECODING RATIOS: (ONE OF TWO)

① USE A/B IF PRIMARY RATIO IS 3/4
OR
② USE C/D IF PRIMARY RATIO IS 4/3  } 2/1 OR 1/2 (RESULTING RATIO)

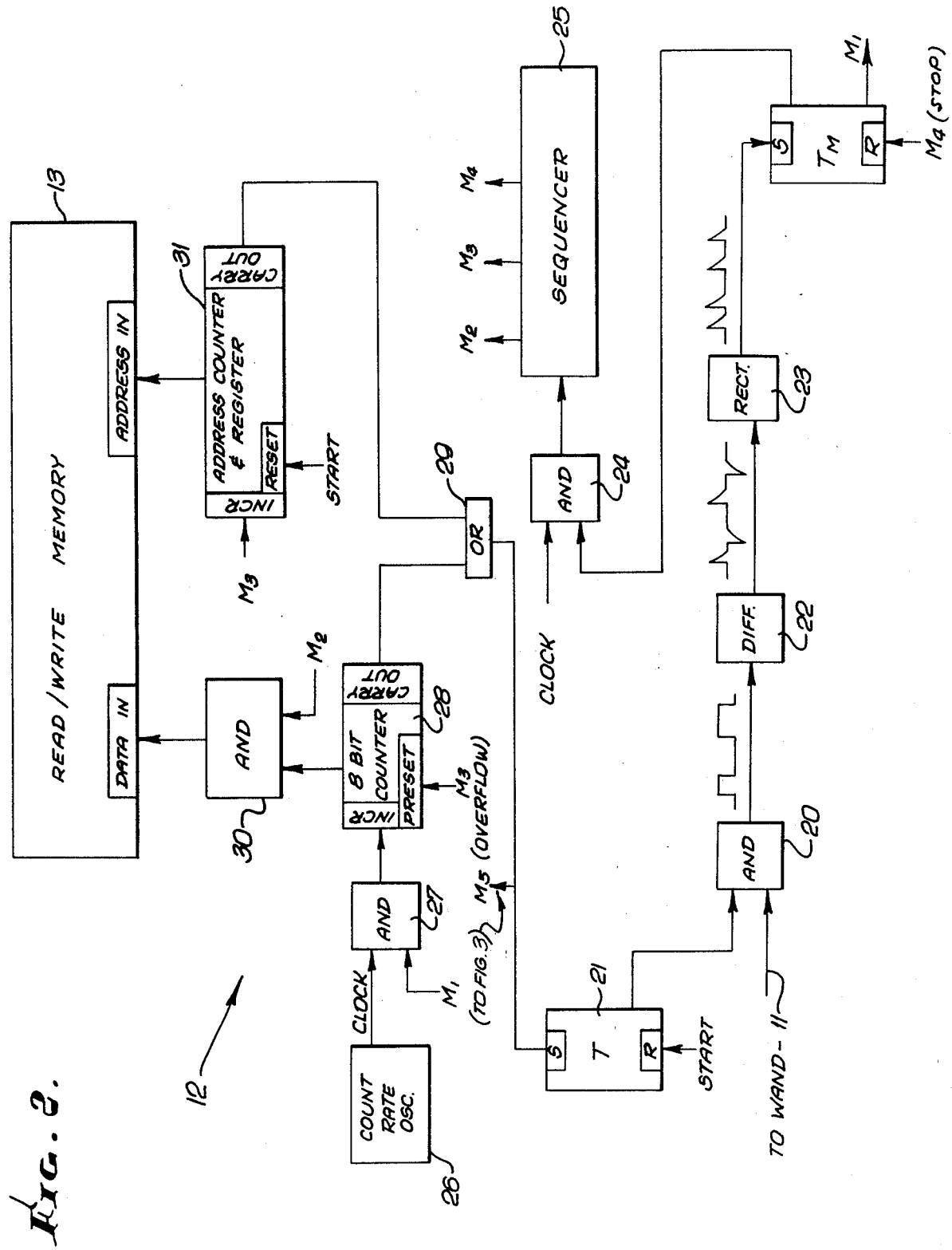

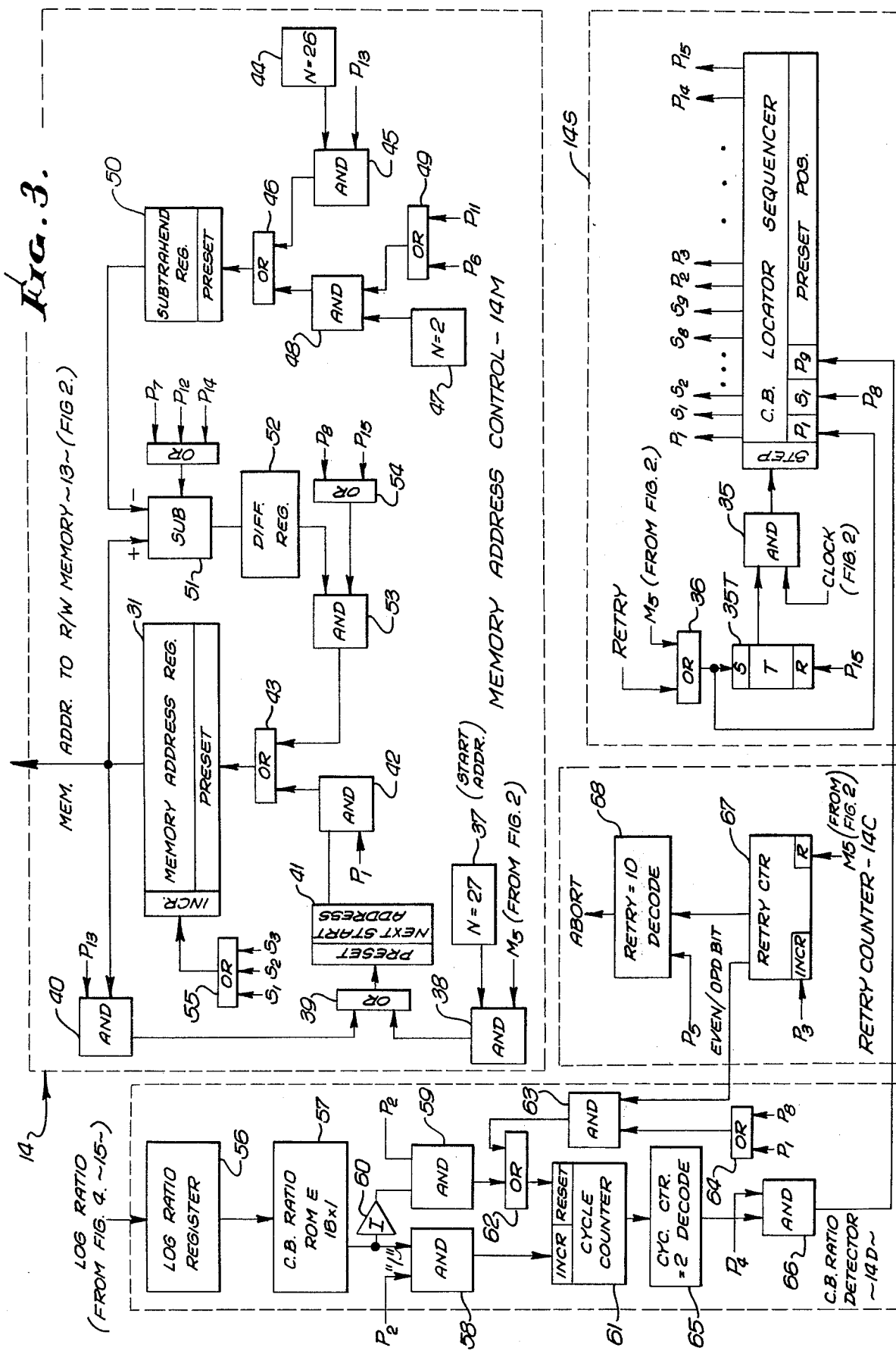

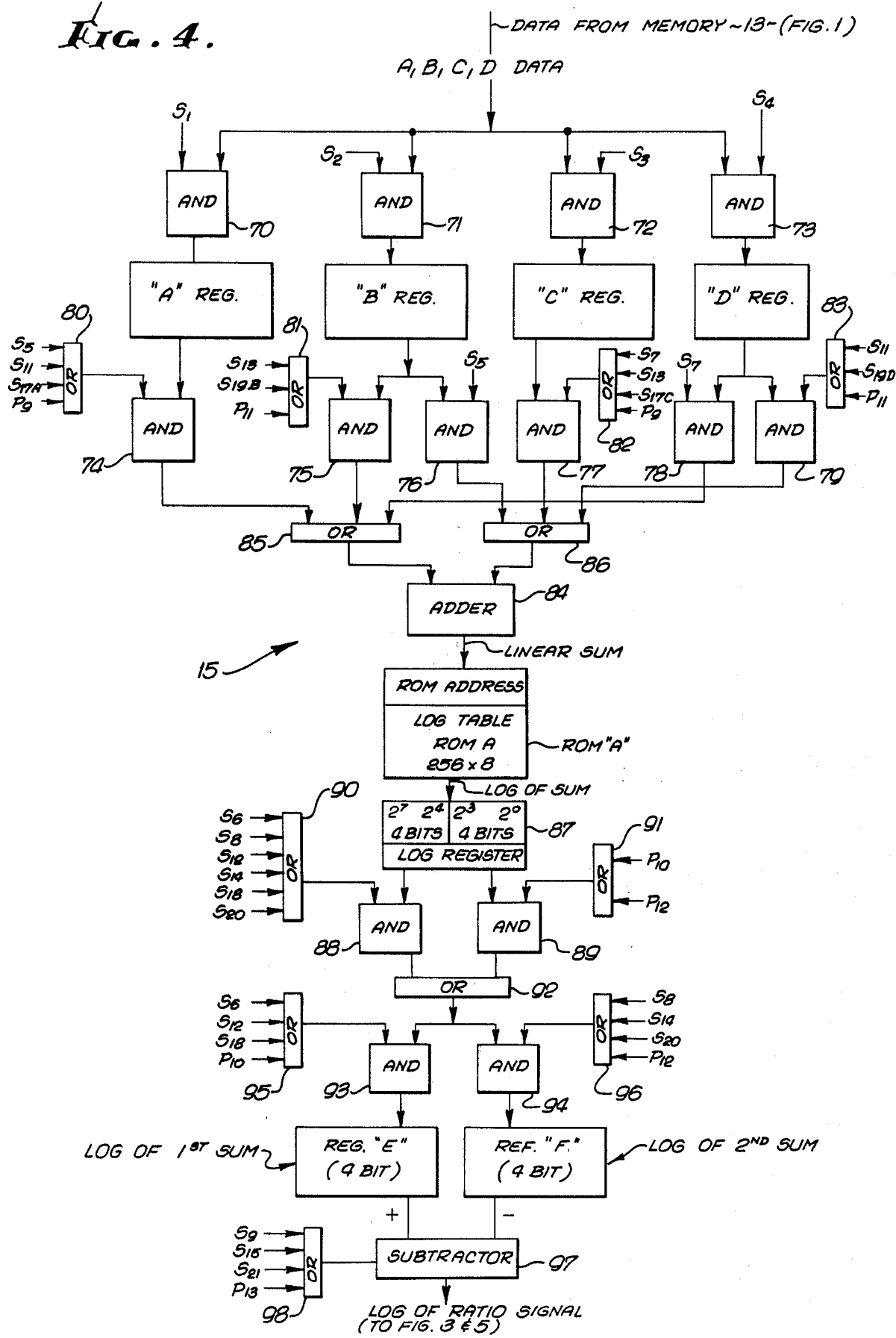

METHOD AND APPARATUS FOR READING AND DECODING A HIGH DENSITY LINEAR BAR CODE

This is a continuation application Ser. No. 13,804, filed Feb. 21, 1979 which was a continuation of original application Ser. No. 787,855, filed Apr. 15, 1977, now abandoned.

PRIOR ART AND SUMMARY OF THE INVENTION

This invention relates to a method and apparatus for reading and decoding a high density, linear bar code of the type of the Universal Product Code standard symbol and variations thereof.

The grocery industry has adopted a linear bar code that is known as the Universal Product Bar Code (UPC) for identifying the items sold in the grocery trade. This Universal Product Code symbol is widely used in the grocery industry by marking it on packages, containers, cans or the like in which the items are packaged and sold. The standard symbol comprises a series of parallel light and dark bars of different widths with an optical character recognition (OCR-B) numeric font equivalent of the symbol printed along with the bar code symbol. The standard UPC symbol is also employed on shelf labels for identifying the items stored on the shelves for use in inventory control purposes and the like. Various prior art publications disclose the standard UPC symbol and its characteristics as utilized in the grocery industry and the various versions for use in other industries, i.e., for use on drug and health related items and general merchandise or department store items. In addition, special versions that have been developed such as the zero-suppression version to facilitate marking the symbol on packages that are too small to include the UPC symbol and the distribution symbol (DCI) and which DCI symbol is designed for printing on shipping containers. The primary advantage in utilizing the UPC symbol is automatic item identification at the check stand in conjunction with automatic, electronic check-out systems. In present day check-out systems, the UPC bar code symbol is interpreted by a high speed laser beam scanner.

There is also a need for a portable data acquisition device to scan the UPC symbol and its descendant, the DCI symbol. This is most easily satisfied with a hand-held wand scanner. A wand scanner need not have the depth of field that the check stand scanner requires since it is scanned in contact with the label. It does not require the speed of the laser beam since it is hand propelled. Also, the laser scanner must reject the majority of its input as extraneous graphics but a wand scanner would "see" little extraneous input. However, a portable scanner would be battery powered and therefore low power consumption is important. Also, while the velocity of the laser beam is known, hand movement velocities vary over a wide range and exhibit significant accelerations.

Prior art methods of reading the UPC symbol consist of decoding the symbol through the use of delta distances to eliminate printing tolerances due to ink spread resulting from printing the symbol on a surface. Ink spread is the major printing error to be considered in decoding bar coded data. Delta distance measurements are the distances between the leading edges and the trailing edges of a combination of successive bars and spaces in the bar coded symbol. The delta distance measurements are utilized to obtain ratios of the selected delta distances for decoding the symbol. If the ink spread is uniform in the recorded symbol, these decoding ratios do not change as a result of the ink spread. There are sixteen combinations of ratios, but when the forward and reverse sequences are considered, twenty ratios are required. Accordingly, some further measurement must be made to resolve the ambiguities that result when a distinct delta distance ratio cannot be solely used for decoding purposes. These other measurements do not have the advantage with respect to printing tolerances that the delta distance measurements have. Some early prior art decoding techniques required that the decoding circuitry distinguish between a large number of ratios and very close ratios thereby requiring very good resolution for decoding purposes. Such resolution is not readily obtainable, particularly in a hand-held wand scanner or a portable decoding unit. More recently, decoding techniques have been developed so as to reduce the number of ratios to be discriminated between to four ratios having relatively good separation between them so that they may be readily distinguished. In this type of decoding arrangement, the ratios are selected so that the numerator and denominator have one bar and one space so that the ink spread is not a factor in the resulting ratio. Since in the UPC symbol each coded digit has a forward and a reverse sequence, there are still combinations that produce ambiguities when these prior art techniques are resorted to. These digits cannot be unambiguously decoded solely on the basis of the aforementioned delta distance ratios and some other means or ratios must be utilized to eliminate the printing tolerance problem and yet unambiguously decode all of the coded digits. The prior art methods of implementing the aforementioned decoding techniques in terms of delta distance measurements are generally by means of utilizing the high speed laser beam scanner and associated circuits for computing the decoding ratios. In a manual wand scanning technique for reading the UPC symbol and similar symbols, wide ranges of velocities may result from passing the wand over the recorded symbol whereby these prior art circuits for computing the delta distance ratios are not practical. Some prior art techniques utilized with hand-held wand scanners for reading bar coded data utilize logarithm time based circuits, however, these circuits are not practical for computing the delta distance ratios for decoding the UPC symbol.

The present invention provides an improved, very reliable low cost, lower power consuming method and apparatus for reading and decoding a high density linear bar code of the type of the UPC symbol that may be advantageously employed in a manual wand scanner but may also be used in other decoding apparatus. The invention provides reliable reading and decoding that is highly tolerant to wand acceleration and poorly printed symbols and symbols having a wide range of printing tolerances, yet permitting a simplified technique for resolving ambiguities. The implementation of the present invention recognizes and takes advantage of the minimum amount of graphics rejection required in a hand-held wand, vis-a-vis, a high-speed laser beam scanner. The implementation of the present invention is advantageous over prior art methods and apparatus in that it measures the widths of the successive bars and spaces in a bar coded symbol in real time and stores them in a storage device of the type of a random access memory which permits sophisiticated post processing techniques to be utilized once the measurements are made. In addition, certain computations may be readily made by use of logarithmic techniques which permit wide dynamic ranges without the need for multiplying and dividing large numbers. By utilizing the coded information from the central portion or a standard portion of coded symbol of the UPC type, ink spread corrections can be readily made and by selecting proper secondary decoding ratios for ambiguity resolution purposes that are dependent upon the primary decoding ratios whereby the ambiguities may be resolved with confidence.

These and other features of the present invention may be more fully appreciated when considered in the light of the following specification and drawings, in which:

FIG. 1 is a schematic block diagram of the reader for manually reading a UPC symbol or a derivative thereof and embodying the present invention;

FIG. 2 is a schematic block diagram of the linear time to digital converter utilized in the system of FIG. 1;

FIG. 3 is a schematic block diagram of the center bar locator utilized in the system of FIG. 1;

FIG. 3A is a diagrammatic illustration of the address positions in a memory of the center bar pattern for a symbol of the type illustrated in FIG. 1A;

FIG. 3B is a representation of the information stored in the read only memory E utilized in the center bar locator of FIG. 3;

FIG. 4 is a schematic block diagram of the ratio computer utilized in the system of FIG. 1.

Figure 1A:
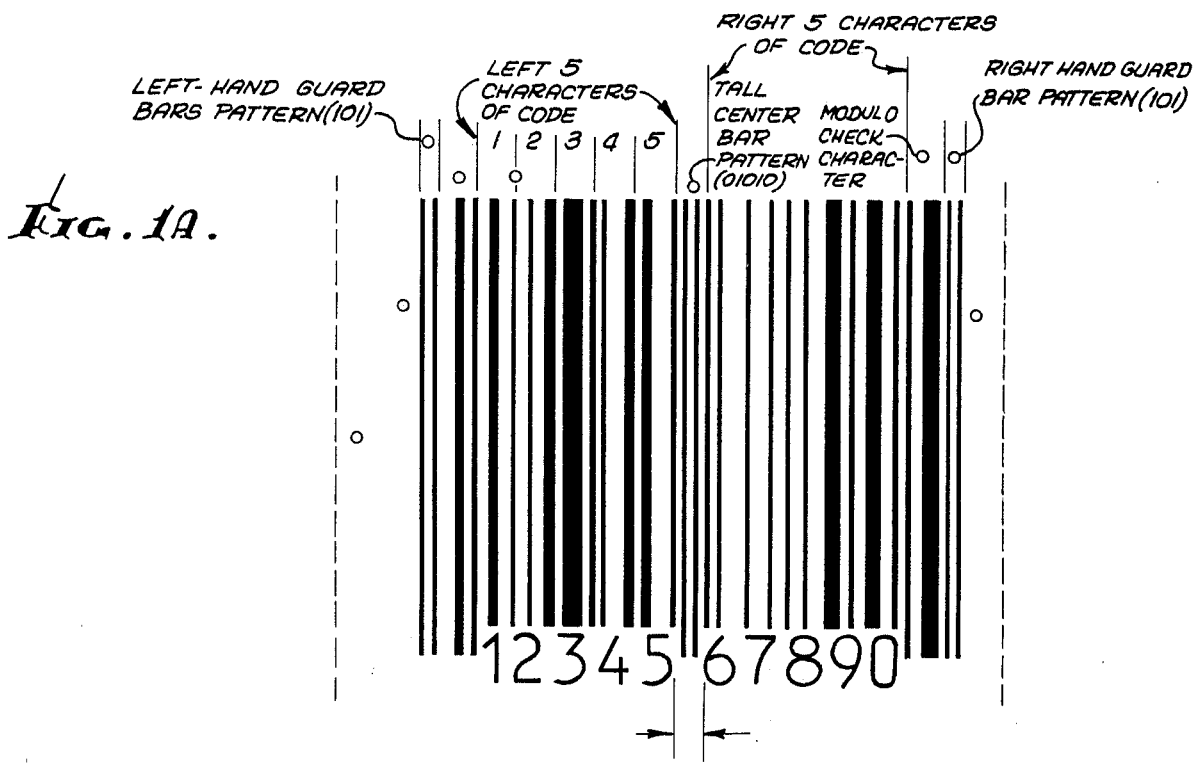
FIG. 1A is a representation of the UPC standard symbol.

Now referring to the drawings, the invention will be examined in detail as the concept may be implemented for reading and decoding a high density, linear bar code of the type of the grocery industry Universal Product Code (UPC).

Figure 1B:
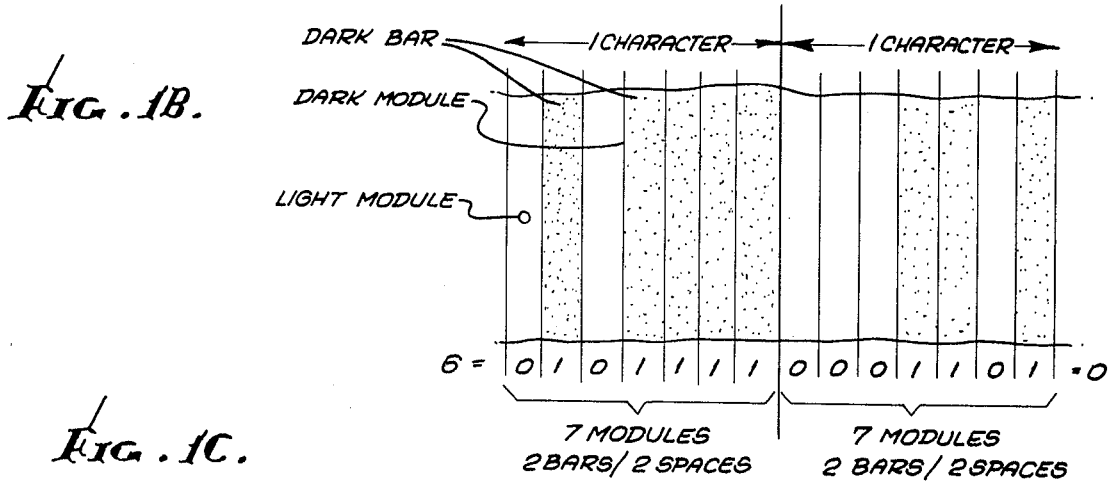
FIG. 1B is a representation of the character structure of the symbol illustrated in FIG. 1A.

For the purpose of facilitating the understanding of the concept of the present invention, the basic characteristics of the standard UPC symbol as illustrated in FIGS. 1A and 1B will be first examined. The basic characteristics of the standard Universal Product Code symbol as illustrated in FIG. 1 includes a series of light and dark parallel bars with a light margin on each side. As illustrated in FIG. 1A, there are 30 dark bars and 29 light bars for any 10 character code. The overall shape of the symbol is rectangular. As can be best appreciated from examining FIG. 1B, each character or digit of the code is represented by two dark bars and two light spaces. Each coded character is made up of seven modules. A module may consist of either a dark bar or a light bar (or a sequential combination of 1, 2, 3 or 4 dark bars or light bars). To this end, in FIG. 1B the left-hand portion of the character structure illustrated represents the digit 6 wherein the seven modules are characterized as two bars and two spaces. From this, it will be noted that the right-hand bar consists of a series of four dark modules. The right-hand portion of the character structure is similarly encoded in terms of two bars and two spaces for representing the decimal digit 0. It will also be appreciated from examining FIG. 1A in particular, that each of the two characters coded in terms of the UPC symbol is independent of the other. The symbol is designed to be recordable or printed by conventional methods. The UPC symbol is "wandable" which means a simple hand-held device can be used to scan or read the symbol.

Fixed position scanners have been constructed to scan this symbol in an omnidirectional manner. Specifically, the symbol can be automatically read by a scanner, such as a laser beam scanner, when the symbol is drawn past the scanner in any orientation. Whether the symbol is read by means of a hand-held device or by a device having omnidirectional characteristics, there must be some relative motion produced between the recorded symbol and the scanning device.

The UPC symbol as represented in FIG. 1A also includes a standard pattern comprising a group of coding modules having known width ratios between successive coding modules. As utilized in the standard UPC symbol, the standard patterns illustrated in FIG. 1A include three such patterns having a 1:1 width ratio and which patterns are identified as the left-hand guard bar pattern, the right-hand guard bar pattern and the tall center bar pattern. The right-hand and left-hand guard patterns are defined to represent a dark-light-dark pattern or 1 0 1. The tall center bar pattern represents the pattern of information 0 1 0 1 0 or a light bar-dark bar-light bar pattern. The central bar pattern separates the forward and reverse digits that are encoded by means of the symbol. To the left of the center bar pattern there are five characters of the code which represent the "forward" encoded characters, while to the right of the tall center bar pattern there are five characters that are encoded in the "reverse" direction. The forward, or left characters, and the reverse, or right characters, refer to the fact that the right-hand characters represent the binary complement of the left-hand characters. For the decimal digit zero, for example, the left-hand encoding is 0001101, while the right-hand encoding for zero is 1110010. The left-hand characters are considered to have an odd parity and the right-hand characters an even parity. The left-hand character will comprise 3 or 5 dark modules and always begin with a light space. The right-hand characters will comprise 2 or 4 dark modules and always begin with a dark module.

As illustrated in FIG. 1A, the standard symbol also includes a modulo check character encoded between the right-hand guard bar pattern and the last module of the reverse character field. In addition to the left-hand guard pattern and to the right of the left-hand guard bar pattern, information is recorded which may be utilized to identify the number system of the characters encoded by means of the symbol and having a preselected width. In reading any bar coded symbol, the symbol is not only read as recorded but the peripheral recorded information adjacent the desired information bar coded pattern is generally detected whether it is related to the symbol or not. In the laser scanner techniques, for example, the majority of the extraneous graphics must be rejected while in a hand-held wand scanner very little extraneous graphics are sensed by the scanner.

As indicated hereinabove and illustrated in FIG. 1B, the UPC symbol comprises two bars and two spaces for representing a single character. The order of the bars and spaces may be space-bar-space-bar, or the reverse sequence in accordance with the direction of the scan and the field of the recorded character. For the purposes of examining the present invention the sequencing assumed is A, B, C, D wherein the spaces and the bars are identified in accordance with FIG. 1C for both the forward and the reverse directions. Stated differently, each character, whether recorded in the forward direction or the reverse direction will be represented by the sequence A, B, C and D. With this sequence, the two primary decoding ratios utilized herein are defined as:

$$\left(\frac{A+B}{C+D}\right) \text{ and } \left(\frac{A+D}{B+C}\right)$$

Figure 1C:
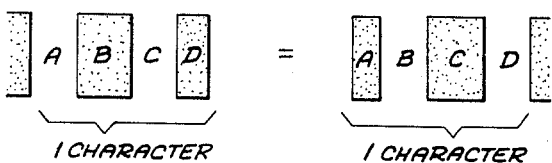
FIG. 1C is a representation of the character structure of the symbol of FIG. 1A and identifying the primary and secondary decoding ratios.

In examining FIG. 1C, it will be noted that each of these primary decoding ratios contain in both the numerator and denominator one bar and one space so that any ink spread that may be present does not affect the ratio. These primary decoding ratios produce the numerical ratios 2/5, 3/4, 4/3 and 5/2. A pair of these primary ratios are utilized to decode a single character. However, it should be recognized that in any delta distance method utilizing the aforementioned decoding ratios, an ambiguity occurs and certain characters cannot be unambiguously decoded solely on the basis of the primary decoding ratios. The present invention utilizes selected and simplified secondary decoding ratios for resolving the ambiguity and also corrects any print tolerances rendering the decoding of a character symbol on the basis of a primary and secondary ratio very reliable. The secondary ratios, which are utilized in accordance with the present invention, are dependent upon values resulting from developing the two primary ratios. As indicated in FIG. 1C, if the two primary ratios produce the ratios 3/4, 4/3 or 4/3, 3/4, then the secondary ratios must be assigned in accordance with the values of the primary ratios. If the selected primary ratio upon which thesecondary decoding ratios are dependent is 3/4 then the ratio of the widths of the modules A and B (A/B) is examined while if the primary ratio is 4/3, then the secondary ratio of the width of the modules C and D (C/D) is examined. The secondary ratios are examined to determine if they are 2/1 or 1/2. In any event, for those digits that do produce an ambiguity, such as 1 and 7 and 2 and 8, they are decoded on the basis of the two primary decoding ratios and the selected secondary decoding ratio. All of the other digits may be unambigously decoded on the basis of primary decoding ratios alone.

The improved scanner and decoder of the present invention is implemented by means of a microprocessor. The widths of each bar and each space of a scanned symbol are measured and stored in a counter that is driven by a linear time base. These measured distances or widths are then transferred to a memory, once a measurement is completed and the successive measurements are stored in successive storage locations in the memory until all of the measurements are completed. As indicated hereinabove, in the scanning of a recorded symbol there is extraneous graphics on the label with the UPC symbol that may be sensed and this extraneous data is also stored in the memory along with the desired information. Accordingly, the information scanned before scanning the symbol itself as well as the information detected after the symbol is stored in the memory. There is no decoding while the label is being scanned. This procedure requires that the "label" having the desired encoded information be located or "framed" in the memory before it can be decoded. As indicated hereinabove, the standard UPC symbol has a standard central bar pattern wherein characters are encoded to the left and to the right of the center bar pattern. The data in the memory is examined so that the encoded data may be located therein by examining and locating the stored data representing the standard center bar pattern. Once this center bar pattern is located, it is utilized in accordance with the present invention for identifying the locations in storage of the encoded characters to the left and to the right thereof. Stated differently, once the center bar pattern position in memory is located, the locations of the modules A, B, C and D will be known for each character of the symbol. Once these modules are located in the memory, then the sums of the modules may be computed to determine the values of the two primary decoding ratios. Once the primary decoding ratios are computed, the secondary decoding ratios may be computed and the symbol decoded. If the two primary ratios produce any combination of 3/4 and 4/3, an ambiguity exists which is resolved by means of the aforementioned secondary decoding ratios; see Table I.

TABLE I

| Primary Ratios | | Secondary Ratio | Resulting Digit |
|---|---|---|---|
| $\frac{A+B}{C+D}$ | $\frac{A+D}{B+C}$ | | |
| 2/5 | 2/5 | | 3 Reverse |
| 2/5 | 3/4 | | 4 Forward |
| 2/5 | 4/3 | | 0 Reverse |
| 2/5 | 5/2 | | 6 Forward |
| 3/4 | 2/5 | | 5 Forward |
| 3/4 | 3/4 | $\frac{A}{B} = \frac{2}{1}$ | 7 Reverse |
| 3/4 | 3/4 | $\frac{A}{B} = \frac{1}{2}$ | 1 Reverse |
| 3/4 | 4/3 | $\frac{A}{B} = \frac{2}{1}$ | 2 Forward |
| 3/4 | 4/3 | $\frac{A}{B} = \frac{1}{2}$ | 8 Forward |
| 3/4 | 5/2 | — | 9 Reverse |
| 4/3 | 2/5 | — | 5 Reverse |
| 4/3 | 3/4 | $\frac{C}{D} = \frac{2}{1}$ | 1 Forward |
| 4/3 | 3/4 | $\frac{C}{D} = \frac{1}{2}$ | 7 Forward |
| 4/3 | 4/3 | $\frac{C}{D} = \frac{2}{1}$ | 8 Reverse |
| 4/3 | 4/3 | $\frac{C}{D} = \frac{1}{2}$ | 2 Reverse |
| 4/3 | 5/2 | — | 9 Forward |
| 5/2 | 2/5 | — | 3 Forward |
| 5/2 | 3/4 | — | 4 Reverse |
| 5/2 | 4/3 | — | 0 Forward |
| 5/2 | 5/2 | — | 6 Reverse |

The secondary ratios A/B and C/D do not contain delta distance properties and so exhibit a wide range of values. While they do not overlap according to the symbol specification, other errors or out-of-tolerance symbols can cause reading errors.

Included in the standard UPC symbol are guard bars and center bars with a 1:1 ratio. If the logarithm of the ratio of a center bar to a center space is other than zero, the ratio is not 1:1 and the degree of deviation therefrom is indicated by the magnitude of the log. This provides information on the direction and magnitude of print tolerance which can be used to correct the secondary ratio measurements. For example, if the ratio of a center bar to a center space is measured as 2:1, it can be inferred that the symbol is overprinted. In that case, a nominal 2:1, A/B ratio would be measured as close to 4:1. If the measured A/B ratio is divided by the measured center bar to center space ratio, the nominal value of 2:1 would result.

The computations are simplified by utilizing logarithms. The division results by subtracting the logs. If the A/B (or C/D) ratio is a space-to-bar ratio, then the logarithm of the center bar to center space ratio is added to the A/B ratio to effect multiplication. In reading from left to right, the correction factor is logarithmically added to the measured widths of the first half of the symbol while it is subtracted from the righthand characters. In a reverse read, the first half is the right half.

A 1:1 ratio does not change proportionately to a 2:1 under conditions of ink spread. But a correction can be made if the only nominal ratios are 1:2 and 2:1. If all other ratios were to be encountered, in a middle bar to middle bar space ratio, for example, the accuracy of the correction would be less accurate.

With the above structure and the general philosophy for decoding the symbol discussed above in mind, the general organization of the decoding system will now be examined as it is represented in the block diagram of FIG. 1. The UPC symbol is illustrated in FIG. 1 as it may be recorded or printed on a label 10. The label 10 is read by passing the optical wand 11 over the symbol for detecting and signalling the bars and spaces representing the data in terms of the UPC symbol. The optical wand 11 provides signals indicating the transition between a white bar and a white space and vice versa. Such optical wands are well known in the art and such a wand reading system is exemplified by the disclosure in U.S. Pat. No. 3,925,639 owned by the same assignee as the present invention. These wand signals or raw data are applied to a linear time to digital converter 12. The converter 12 measures the amount of time spent by the wand 11 in traversing each bar and each space and these width measurements are stored in a read/write memory 13. The width measurements are stored in sequence in storage locations in the memory 13. The read/write memory 13 may conveniently be a random access memory (RAM). When the transitions sensed by the wand 11 terminate, control of the system is passed from the linear time to digital converter 12 to a center bar locator 14. The center bar locator 14 searches the memory 13 for ratios that satisfy the pattern for the center bar of the UPC symbol or the center bar pattern 0 1 0 1 0. The center bar pattern locator 14 utilizes a ratio computer 15 for this purpose. The ratio computer 15 is utilized also by a character decoder 16.

When the ratio computer 15 is under the control of the center bar locator, it receives the linear values of the width measurements for the modules A, B, C and D from the memory 13 and adds a selected pair of these values and computes preselected ratios to determine if a valid center bar pattern is present. The center bar locator 14 determines the position of the center bar pattern in the memory by determining that a preselected pair of ratios are both one. The center bar pattern represents the pattern 0 1 0 1 0 and in reading from left to right these can be considered as the A, B, C. D and E modules. To determine that a valid center bar is located in the memory 13, the center bar ratios $$\left(\frac{A+B}{C+D}\right) \text{ and } \left(\frac{B+C}{D+E}\right)$$

are developed and examined. If both of these ratios are one, then the center bar pattern has been correctly located in the memory 13. By examining both of the aforementioned ratios and when the correct result is produced, the system will be assured that the center bar pattern was begun with a space and is correctly located. If either of the above ratios do not compute to one, the process must be repeated until two successive ratios of unity are detected. It should be noted in the calculations for locating the center bar pattern that the delta distances are utilized and therefore if the ink spread is uniform it will not effect the determination of the correct location of the center bar pattern. If after the preselected number of trys, the desired ratios are not detected, then the read is aborted.

Once the conditions for a valid center bar are satisfied, a recording or print tolerance correction character is computed. The print tolerance correction is computed on the basis of the sensed widths of the modules comprising the center bar pattern. The magnitude of the correction is obtained by measuring the ratio of the standard bars to the guard spaces. Accordingly, to determine the value of the print tolerance correction, the ratio $$\left(\frac{A+C}{B+D}\right)$$

is computed. In this ratio, (A+C) represents the widths of the bars while (B+D) represents the widths of the spaces and if the center bar pattern is correctly located, the ratio should be one as that was the basic logic of the symbol prior to recording or printing it. Once this print tolerance correction value is computed, the memory address of the memory 13 is set to the location of the start of the first character to be decoded. At this point in the decoding process, the control is passed to the character decoder 16.

The character decoder 16 utilizes the ratio computer 15 for executing its function in decoding the pattern of modules to the left and the right of the center bar pattern. As in the case of the valid center bar pattern recognition, the characters are decoded by a sequence of ratios produced by the ratio computer 15 under the control of the character decoder 16. The character decoder 16 then steps through the sequence of 12 characters plus the center bar pattern as stored in the memory 13 starting from the location noted by the center bar locator. Once each of the primary ratios are computed, the secondary ratios are computed to resolve any possible ambiguity. Before the secondary decoding ratios are computed, the printing tolerance correction character is combined with the data representing the width of the modules as stored in the memory 13 and then these corrected values are utilized in computing the secondary decoding ratios. If any of the 12 characters fail to properly decode, control is returned to the center bar locator 14. Once all of the characters are properly decoded by the character decoder 16 then the control is passed from the decoder 16 to the validity check circuit 17.

The validity check circuit 17 will not be described in detail since it does not constitute a portion of the novel aspect of the method and apparatus for decoding the UPC symbol. It is merely included for the sake of the completeness of the read cycle iterative loop. To this end there is included with each character a read direction indicator. In order that the information decoded be valid, the read direction indicators must all be consistent. If the direction of the reading by the wand 11 is in the reverse direction, the character order is reversed and the check digit verified. If either of these tests fail, control of the system is returned to the center bar locator 14 to determine the correct location of the center bar pattern in the memory 13. This process is repeated until a valid read is accomplished or the potential locations of a valid symbol as stored in the memory 13 are exhausted. In this latter case, the read cycle is aborted.

With the above general organization of the decoding system in mind, the details of the linear time to digital converter 12 as illustrated in FIG. 2 will now be examined in detail. The linear time to digital converter 12 comprises the circuit elements for receiving the wand raw data information from the wand 11 and processing the data for storage in the read/write memory 13. For this purpose, an AND circuit 20 has one input terminal coupled to receive the wand raw data information at its input. The other input of the AND circuit 20 is coupled to a start/stop toggle 21. The output circuit from the AND circuit 20 is coupled to a differentiator circuit 22, which in turn is coupled to a rectifier 23. A toggle TM has its set input, S, coupled directly to the output of the rectifier 23. The reset output for the toggle TM is identified as M1. The set output of the toggle TM is coupled to an AND circuit 24. The output of the AND circuit 24 is coupled to a sequencer 25 which provides the sequential output signals M2, M3 and M4. The real time measurements result through the provision of a count rate oscillator 26 which provides clock pulses at a preselected rate to an AND circuit 27. The other input to the AND circuit 27 is the M1 reset output from the toggle TM. The clock pulses from the oscillator 26 are also applied as a second input to the AND circuit 24 for controlling the operation of the sequencer 25. The AND circuit 27 has its output connected to the incrementing input of an 8-bit counter 28. The 8-bit counter may be preset through a signal coupled to its preset input and which signal is identified in FIG. 2 as the M3 signal from the sequencer 25. The 8-bit counter 28 also has an overflow output which is identified as a carry output and this output signal is coupled to an OR circuit 29 as one input thereto. The count outputs for the 8-bit counter 28 are coupled as one input to an AND circuit 30. The other input to the AND circuit 30 is the M2 signal from the sequencer 25. The output of the AND circuit 30 enables the data input terminal for the read/write memory 13 and transfers data into the memory at the successive storage locations. The read/write memory 13 is under the control of an address counter and register 31. The address counter and register 31 has an incrementing input further identified as having the M3 signal from the sequencer 25 coupled thereto for incrementing the successive addresses of the memory 13. The address counter and register 31 also have an overflow output terminal identified as a "carry out" and this output signal is applied as a second input signal to the OR circuit 29. The starting signal for initiating the read cycle is coupled to the reset terminal for the address counter 31. The OR circuit 29 will produce an overflow output signal identified as an M5 signal if either of its inputs receive an overflow signal from the counter 28 or the register 31. The M4 signal from the sequencer 25 is applied to the reset terminal R for the toggle TM for resetting the toggle at the completion of reading a module of the UPC symbol. The "start" signal is also coupled to the reset terminal of the toggle 21 for enabling the AND gate 20.

The operation of the linear time to digital converter 12 may now be appreciated with the above structure in mind. This element 12 may be provided with a switch to function to start the reading operation and apply a "start" signal to the reset terminal for the toggle 21 or the "T" toggle, as well as to the reset terminal for the address counter and the register 31. The unit 12 on the other hand may be armed to be automatically responsive to certain conditions that indicate that an attempt is to be made to read the label 10, such as when the wand 11 is placed against the white surface or the end of the label 10 as disclosed in U.S. Pat. No. 3,925,639, for example. As the wand 11 is moved over the label 10, it detects the transitions between the dark bars and the white spaces. When these transitions occur, they are passed through the AND gate 20 and are differentiated in the element 22 and rectified at the element 23 for application of the resulting signals to the "set" terminal of the toggle TM. The toggle TM is "set" at each transition between the detected modules. The clock pulses provided by the oscillator 26 are accumulated in the 8-bit counter 28 between the time intervals, the toggle TM is reset resulting from the application of the M1 signal to AND gate 27. The setting of the toggle TM will cause the sequencer 25 to be enabled and disable the application of the clock pulses to the 8-bit counter 28. This disabling of the clock pulses to the counter 28 results through the change in state of the M1 signal upon the toggle TM being "set". At this point in time, the information that has been accumulated in the counter 28 is transferred into the memory 13, the address of the memory for storing the next piece of information is incremented between transitions and then resetting the toggle TM. The sequencer 25 is provided to perform these functions by generating the sequential signals M2, M3 and M4 in that sequence. The sequencing opertions that result after the setting of the toggle TM are as follows:

| Sequencing Signal | Function |
| --- | --- |
| M2 | Load the count of the counter 28 into the memory 13. |
| M3 | Increment the memory address of the register 31 and preset the count of the counter 28. |
| M4 | Reset the toggle TM and accumulate the counts for the next detected module or next bar or space. |

The M1 signal can be considered as a "stop" signal while the M5 signal transfers control of the system to the center bar locator 14.

The memory 13 is preferably defined to have the capacity to accumulate the results of 64 measurements to permit the wand 11 to traverse any extraneous graphics that may be associated with the UPC symbol on the label 10. The count interval for the counter 28 is about 40 microseconds and the count capacity is 8 bits, or counts. It will be recognized that some finite amount of time is required to execute the functions identified above after a transition point is detected by the wand 11. For this purpose the counter 28 is preset to a value that represents the count that would have been accumulated during this processing time. In one arrangement, the minimum count is preset to 7 to allow sufficient time to store the accumulated measurements in the memory 13 after the transition. The counter 28 is preset to count 7 at the beginning of each measurement by the M3 signal to preserve the accuracy of the decoding system.

If the counter 28 or the memory address counter 31 overflows and provides an output signal, the overflow is indicated by the M5 output signal from the OR gate 29. If the M5 signal occurs, it is assumed that the end of the label 10 has been reached and the M5 signal is effective to transfer control of the system from the converter 12 to the center bar locator 14.

Now referring to FIGS. 3, 3A and 3B, the block diagram of the circuits for recognizing and identifying the location of the center bar pattern of the UPC symbol in the memory 13 will be explained. Basically, the center bar locator includes a center bar ratio detector 14D, a retry counter 14C, a center bar locator sequencer 14S and a memory address control unit 14M. The center bar locator unit 14 operates in conjunction with the ratio computer 15 for computing the desired ratios that are processed by the center bar locator 14. During the time interval that the center bar pattern is being located in memory, the ratio computer 15 is under the control of the center bar locator unit 14. The operation of the ratio computer will be described more fully hereinafter.

The center bar locator sequencer 14S as illustrated in block form in FIG. 3 includes a sequence for providing the signals identified, as P1, P2, P3, etc. and S1, S2, S3, etc. The sequencer functions such that when it is preset to a specific state all of the other positions of the sequencer are reset. The preset positions are identified in FIG. 3 at the bottom of the sequencer as P1, S1, P9, etc. The input circuit for the sequencer advances the sequencer as it sequentially receives a signal at its step input. The sequencer is controlled and sequentially advanced in response to the clock pulses generated by the clock pulse oscillator 26. The clock pulses from the oscillator 26 are applied as one input to an AND circuit 35. The other input to the AND circuit is derived from the "set" output from the toggle 35T. When a clock pulse is applied to the input of the AND circuit 35 at the time that the toggle 35T is in its "set" state, an output signal will be applied to the step input of the sequencer to advance it to the next successive position. Accordingly, when the toggle 35T is in the set state, the sequencer will be sequentially advanced in response to the reception of each clock pulse at the AND gate 35. The set input of the toggle 35T is controlled by an OR gating circuit 36. The OR circuit receives the overflow signal M5 from the linear time to digital converter 12 in addition to a "retry" signal. It will be recalled that the control of the system is transferred from the linear time to digital converter 12 to the center bar locator 14 in response to the M5 signal. The output of the OR circuit 36 is coupled to the set input of the toggle 35T as well as to the P1 preset position for the sequencer.

The memory address control unit 14M of the center bar locator 14 utilizes and time shares the address counter and register 31 for the memory 13 utilized in the linear time to digital converter 12. It is illustrated in FIG. 3 as a separate circuit element to simplify the explanation of the invention. The memory address register 31 has a "preset" input for setting a desired address into the address register 31 as well as an "incrementing" input for sequentially incrementing the addresses stored in the register. For the purposes of the present invention an address may be preset into the register 31 such as the "start" address entered into the unit 37 and this "start" address is stored in the register to commence a read-out of the memory at that address. For this purpose, the numerical value of a desired address stored in th unit 37 is coupled to an AND circuit 38 in conjunction with the M5 signal (from unit 12) for initiating the sequential search in the memory for the center bar pattern location. The output circuit of the AND circuit 38 is coupled as one input to the OR circuit 39. The other input to the OR circuit 39 is the output of the AND circuit 40 which receives the P13 signal from the sequencer in conjunction with the output signal from the memory address register 31. The output signal from the OR circuit 39 is coupled to a control network identified as a preset and next start address control unit 41. The output of the control unit 41 is applied as one input signal to the AND circuit 42 in conjunction with the P1 signal from the sequencer. The output signal from the AND circuit 42 is in turn applied as one input to the OR circuit 43. The output signal from the OR circuit 43 is applied to the preset input for the address register 31 and thereby may store the address entered at unit 37 in the register.

To the right of the memory address register 31 there is illustrated a control network for subtracting preselected numerical values from the address at which the address register 31 is set. This control network includes a unit 44 for storing a number to be subtracted from the address stored in the address register 31. As illustrated in FIG. 3, the subtrahend is identified as the number 26 stored in the unit 44. The output of the storage unit 44 is applied as one input signal to the AND circuit 45 in conjunction with the P13 signal from the sequencer. The output signal from the AND circuit 45 is applied as one input to the OR circuit 46. The other input to the OR circuit 46 is derived through the control network having a storage element 47 for storing other numerical values (such as the digit 2 illustrated in FIG. 3) to be subtracted from the address stored in the register 31. The element 47 has an output signal coupled to an input circuit for the AND circuit 48. An OR circuit 49 has its output signal coupled to the other input of the AND circuit 48. The input signals to the OR circuit 49 are derived from the sequencer and are identified as the two signals P6 and P11. The output of the AND circuit 48 is coupled as the remaining input to the OR circuit 46. The output of the OR circuit 46 is coupled to the preset input for the subtrahend register 50. The subtrahend register 50 will then store either the number stored in the unit 44 or the unit 47 for further processing. The output signal from the subtrahend register 40 is applied as one input signal to the subtractor 51. The other input to the subtractor 51 is derived from the output of the address register 31. The numerical value of the address provided from the address register 31 has the value stored in the subtrahend register 50 subtracted therefrom and applied and stored in a difference register 52. The signal derived from the difference register 52 is applied as one input signal to the AND circuit 53. The other input signal to the AND circuit 53 is derived from the output signal of the OR circuit 54. The two signals applied to the OR circuit 54 are derived from the center bar locator sequencer 14S and are identified as the two signals P8 and P15. The output signal from the AND circuit 53 is applied as the remaining input signal to the OR circuit 43 for presetting an address into the memory address register 31, i.e., 29−26=3.

The incrementing input of the memory address register 31 is controlled by the output signal from the OR circuit 55. The OR circuit receives the S1, S2 and S3 signals from the center bar locator sequencer for sequentially incrementing the address stored in the address register 31.

The center bar ratio detector 14D is illustrated on the left-hand side of FIG. 3. The ratio detector 14D receives a signal representative of the logarithm of the desired ratio from the ratio computer 15. The logarithmic signal is applied and stored in a log ratio register 56. The numerical value of the log ratio is utilized to address a conversion table stored in a read only memory identified as the unit 57, further identified as the ROM E. The read only memory stores the data from a table for converting the computed logarithmic ratio to numerical value in the decimal number system or any other convenient number system. It will be assumed that the conversion will be to the decimal number system for the purposes of understanding the present invention. Accordingly, the logarithmic ratio signals applied to the ROM E, unit 57, representative of the logarithm of the ratio is converted to a numerical signal representative of the computed ratio. The numeric value signal representative of the ratio that is read out of the read only memory ROM E is applied to a pair of AND circuits 58 and 59. The output signal from the unit 57 is applied to the AND circuit 59 as one input by means of an inverter 60 while it is applied directly, in an unmodified state, to the AND circuit 58. The remaining input signal for each of the two input AND circuits 58 and 59 is the same P2 signal derived from the center bar locator sequencer. Both output signals from the AND circuits 58 and 59 are applied to control a cycle counter 61. The output signal from the AND circuit 58 is applied directly to the incrementing input of the cycle counter 61. The output signal from the AND circuit 59 is applied as one input to the OR circuit 62. The output of the OR circuit 62 is applied directly to a reset input for the cycle counter 61. The remaining input signal applied to the OR circuit 62 is derived from the AND circuit 63. The AND circuit 63 is controlled through an OR circuit 64 that is responsive to the P1 and P8 signals from the sequencer 14S. In addition, an even/odd bit signal derived from a retry counter unit 14C is applied as the remaining input to the AND circuit 63.

The cycle counter 61 has its output applied to a cycle counter decoding network 65 for signalling the decimal value of the count of the counter 61. The output signal of the network 65 is applied as one input to the AND circuit 66 in conjunction with the P4 signal from the sequencer 14S. The output signal from the AND circuit 66 is applied directly to the P9 preset position of the center bar locator sequencer 14S, as illustrated.

The retry counter 14C comprises a retry binary counter 67 for counting the number of attempts the system makes to locate the center bar pattern in the memory and stores the results. The retry counter 67 is reset at its R input by means of the M5 signal from the linear time to digital converter 12. The incrementing input to the counter 67 is responsive to the P3 signal from the center bar sequencer 14S. The even/odd signal from counter 67 is applied to the AND gate 63 for controlling the cycle counter 61 as discussed hereinabove. The count stored in the retry counter 67 is applied directly to a retry decoding network 68 for decoding the output signals from the counter 67 as the counter is counted up. The unit 68 is also responsive to the P5 signal from the center bar locator sequencer 14S. The unit 68 is constructed and defined so that after 10 attempts to locate the center bar pattern in the memory 13 that after the tenth attempt the read is aborted and, accordingly, the output signal from the unit 68 is so identified. This value is selected since a valid symbol would exceed the memory's capacity.

In considering the search for the position of the standard center bar pattern in the memory 13, it is initially assumed that in reading the label 10 that no transitions occurred before the guard bars provided on the UPC symbol on the label 10 so that the center bar pattern would be stored in the memory 13 at addresses 27–31. The first memory location ($\phi$) always contains the measurement for a module that is a bar and therefore all even addresses in the memory store bar measurements. This storage arrangement is illustrated in FIG. 3A wherein the coding module of the center bar pattern are identified as A, B, C. and D along with the decoding ratios for determining a valid center bar pattern. Accordingly, the search for the position of the center bar pattern in the memory 13 is always started with address 27. It will be understood that if extraneous data is stored in the memory 13 during a scan, the memory positions will be displaced and the initial attempts to locate the pattern will result in failure. This starting address is stored in the unit 37 for examining the data stored at address positions 27-31 for determining if the known center bar width ratios are satisfied by the stored data for positively locating the position of the center bar pattern in the memory 13. A valid center bar pattern will be located if both of the ratios $$\left(\frac{A+B}{C+D}\right) \text{ and } \left(\frac{B+C}{D+E}\right)$$

compute to one.

TABLE II

| Sequence | Function |
|---|---|
| P1 | Load start address to memory address register 31 |
| S1 | Load the A register and increment the memory address register 31 |
| S2 | Load the B register and increment the memory address register 31 |
| S3 | Load the C register and increment the memory address register 31 |
| S4 | Load the D register |
| S5 | Select and add the contents of register A to the contents of register B |
| S6 | Load the log (A + B) into register E |
| S7 | Select and add the contents of register C to the contents of register D |
| S8 | Load the log (C + D) into register F |
| S9 | Subtract the contents of register F from the contents of register E |
| P2 | Increment the cycle counter 61 if the resulting log is one; if log is not one, reset counter 61 |
| P3 | Increment retry counter 67 |
| P4 | If cycle counter 61 signals two, jump to sequence P9 |
| P5 | If retry counter 67 signals ten, abort the read |
| P6 | Load subtrahend register 50 with the numeral two |
| P7 | Subtract the contents of the subtrahend |

TABLE II-continued

| Sequence | Function |
|---|---|
|  | register 50 from the contents of the memory address register 31 |
| P8 | Load the contents of the difference register 52 into the memory address register 31; reset cycle counter 61 if the retry counter 67 signals an "even" bit; jump to step S1 |
| P9 | Select and add the contents of register B to the contents of register C |
| P10 | Load the log (B + C) into register E |
| P11 | Select and add the contents of register D to the contents of register E; load the subtrahend register 50 with the numeral two |
| P12 | Load the log (D + E) into register F; subtract the contents of the subtrahend register 50 from the contents of the memory address register 31 |
| P13 | Subtract the contents of register F from the contents of register E; load the subtrahend register 50 with the number 26 |
| P14 | Load correction value register 100 (FIG. 5); subtract the contents of subtrahend register 50 from the contents of the memory address register 31 |
| P15 | Load the contents of the difference register 52 into the memory address register 31; jump to the decoder 16 |

Table II delineates the step-by-step sequence to be followed for locating the center bar pattern in the memory.

The basic sequence of events that occur in searching the memory 13 for the correct addresses of the stored center bar data is that at step P1, starting with memory address 27, the values for the modules A, B, C and D are read out of the memory 13. The first ratio $$\left(\frac{A + B}{C + D}\right)$$

is computed in the ratio computer 15 and further processed through the center bar ratio detector 14D. If it is determined that this ratio is one, the cycle counter 61 will be incremented at P2 time. At the P3 time, the retry counter 67 is incremented to record that a decode attempt is completed. The next sequence is that the information stored in the memory 13, beginning with address 28 through address 31, the new set of data representing the modules A, B, C and D are read out of the memory 13. This results by modifying the start address through sequential steps P6 to P8 and then retrieving the data and computing the ratio through steps P9 through P13.

TABLE III

| Sequence | Memory Address | Cycle Counter 61 | Retry Counter 67 |
|---|---|---|---|
| P1 | 27 | 0 | 0 |
| S1 | 28 | 0 | 0 |
| S2 | 29 | 0 | 0 |
| S3 | 30 | 0 | 0 |
| S4 | 30 | 0 | 0 |
| ≈ | 30 | 0 | 0 |
| P2 | 30 | 1 | 0 |
| P3 | 30 | 1 | 1 |
| ≈ | 30 | 1 | 1 |
| P8 | 28 | 1 | 1 |
| S1 | 29 | 1 | 1 |
| S2 | 30 | 1 | 1 |
| S3 | 31 | 1 | 1 |
| S4 | 31 | 1 | 1 |
| ≈ | 31 | 1 | 1 |
| P2 | 31 | 2 | 1 |
| P3 | 31 | 2 | 2 |
| P4 | 31 | 2 | 2 |
| P9 | 31 | 2 | 2 |
| ≈ | 31 | 2 | 2 |
| P12 | 29 | 2 | 2 |
| P13 | 29 | 2 | 2 |
| P14 | 03 | 2 | 2 |

Table III relates the memory addresses of the register 31 to Table II and indicates the counts of the cycle counter 61 and the retry counter 67 during the sequence of operations detailed in Table II when the center bar pattern is located in the memory on the first attempt.

With this new data, the ratio $$\left(\frac{B + C}{D + E}\right)$$

is computed and if it is determined that this ratio is one, the cycle counter 61 is incremented. In addition, the retry counter 67 is again incremented. The cycle counter 61 now should signal the count 2 and the decode network will be signalling the decimal digit two. This state of conditions will be recognized at P4 time so that the signal from the AND gate 66 will preset the position of the sequencer to P9. At P9 time, the recording or printing correction character is computed as will be explained hereinafter.

The above description of the operation of the center bar locator 14 assumes that only two successive trys were required to locate the center bar pattern in the initially indentified address positions 27-31. If either of the above attempts at locating the center bar position did not produce a ratio of one, the search must be repeated until two successive ratios of unity are detected. During each of these attempts the retry counter 67 is incremented and if the number of attempts reaches 10, as illustrated in FIG. 3, it is assumed that the valid label would exceed the capacity of the memory 13 and accordingly the read is aborted. In addition, it should be noted that if the cycle counter 61 has not been counted up to 2, and the retry counter 67 produces an "even" output signal at AND gate 63, the cycle counter 61 will be reset at P8 time by the signal from the OR circuit 62. This assures that two successive ratios of unity always begin with a space, a requirement for satisfying the conditions for detecting a valid center bar pattern.

At this point, in the detailed step-by-step operation of the center bar locator 14 for locating the position in memory of the center bar information as represented in Table II, it should be recognized that the steps identified as steps S1–S9 and P9–P13 are performed in the ratio computer 15. These steps derive the information in the address positions of the memory 13 having the modules A, B, C, D and E stored therein and compute the logarithmic ratio signal to be applied to the log register 56 of the center bar ratio detector 14D. These sequencing operations will be described in conjunction with the operation of the ratio computer 15.

Table III records the counts in the cycle counter 61 and the retry counter 67 during the center bar locating procedures when the center bar pattern is identified on the first attempt. This table corresponds to the detailed operation of the sequencer as represented in Table II. In following through the step-by-step sequence represented in Table II, it will be noted that there is a correspondence between the operations delineated in Table II and the values represented in Table III. It should be noted that in sequence P6 of Table II that the subtrahend register 50 is loaded with the decimal digit 2 from the unit 47. This value is subtracted from the address of the memory position from which the last piece of information is derived. It will be recalled that in following the steps for deriving the value for A, B, C, and D from the memory 13 that at the S4 sequence time the last memory position interrogated was number 30. Accordingly, when the numeral 2 is subtracted from the memory position 30 at sequence P8 time, the memory address identified is 28 which corresponds to that indicated in Table III. Address 28 then identifies the starting address for the second cycle in the first attempt for identifying the center bar pattern and the information is derived from addresses 28–31. This information is derived through the sequence of steps P9 through P12, as identified in Table II, corresponding to sequences P8, S1–S3 in Table III. After this interval at sequence P13, the numeral 26 stored in unit 44 is entered into the subtrahend register 50. At the P14 sequence, the numeral 26 is subtracted from the memory address at which the memory is pointing, namely 29, so that the new memory address stored in the register 31 is directed to memory position 3 at sequence P14; see Table III. This number 3, of course, is the memory position in which the A module for the first character to be decoded resides. After this memory position is identified at sequence P15, see Table II, the control of the system is transferred to the character decoder 16. The character decoder 16 will start to decode the stored data beginning with memory position 3 and sequentially forward.

It should be noted that the contents of the center bar ratio read only memory 57 is as represented in FIG. 3B. The logarithm of the ratio stored in this ROM E are permitted to be the value minus 1, 0 or plus 1 to allow for any quantization error. This ROM E is utilized to convert the logarithm ratio signal applied thereto to the decimal number of the ratio. As defined and recorded in FIG. 3A, the resulting ratio output signals represent a ratio of one or a ratio other than one.

To complete the understanding of the center bar pattern search in the memory, Tables IV, V, and VI are included for relating the memory addresses of the register 31 and counts of the cycle counter 61 and retry counter 67 when the center bar pattern is not located in the memory 13 on the first attempt.

TABLE IV

| Sequence | Memory Address | Cycle Counter 61 | Retry Counter 67 |
|---|---|---|---|
| Retry |  | 2 | 2 |
| P1 | 29 | 0 | 2 |
| S1 | 30 | 0 | 2 |
| S2 | 31 | 0 | 2 |
| S3 | 32 | 0 | 2 |
| S4 | 32 | 0 | 2 |
| ≈ | 32 | 0 | 2 |
| P2 | 32 | 1 | 2 |
| P3 | 32 | 1 | 3 |
| ≈ | 32 | 1 | 3 |
| P8 | 30 | 1 | 3 |
| S1 | 31 | 1 | 3 |
| S2 | 32 | 1 | 3 |
| S3 | 33 | 1 | 3 |
| ≈ | 33 | 1 | 3 |
| P2 | 33 | 2 | 3 |
| P3 | 33 | 2 | 4 |
| ≈ | 33 | 2 | 4 |
| P12 | 31 | 2 | 4 |
| P13 | 31 | 2 | 4 |
| P14 | 05 | 2 | 4 |

Table IV relates the register 31 values of a first retry after a decoding failure. This new attempt commences with address position 29 in memory and follows the same sequence as noted in Table II. The counts of the counters 61 and 67 at the commencement of the "retry" procedure are both at count 2. At P1 time the cycle counter is reset to zero as a result of the signals applied to the AND gate 63. The P1 signal provides an output signal from the OR gate 64 to the AND gate 63 along with the even bit (2) signal from the retry counter 67. The sequence of operations then commence with the data retrieved from address positions 29 through 32 in accordance with the sequential operations of Table II. The cycle counter 61 is counted up at P2 time to one during the first search cycle and again at P2 time during the second cycle. At P3 time during the first cycle, the retry counter 67 is counted up to three and again at P3 time during the second cycle to four. As noted hereinabove, at P12 time two is subtracted from the address register 31 position and after P13 time, twenty-six has been subtracted. Accordingly, the address register 31 is pointing to address 5 for commencing the next decoding attempt at P14 time.

TABLE V

| Sequence | Memory Address | Cycle Counter 61 | Retry Counter 67 |
|---|---|---|---|
| P1 | 27 | 0 | 0 |
| S1 | 28 | 0 | 0 |
| S2 | 29 | 0 | 0 |
| S3 | 30 | 0 | 0 |
| ≈ | 30 | 0 | 0 |
| P2 | 30 | 0 | 0 |

TABLE V-continued

| Sequence | Memory Address | Cycle Counter 61 | Retry Counter 67 |
|---|---|---|---|
| P3 | 30 | 0 | 1 |
| ↓ | | | |
| ≈ | 30 | 0 | 1 |
| ↓ | | | |
| P8 | 28 | 0 | 1 |
| S1 | 29 | 0 | 1 |
| S2 | 30 | 0 | 1 |
| S3 | 31 | 0 | 1 |
| ↓ | | | |
| ≈ | 31 | 0 | 1 |
| ↓ | | | |
| P2 | 31 | 1 | 1 |
| P3 | 31 | 1 | 2 |
| ↓ | | | |
| ≈ | 31 | 1 | 2 |
| ↓ | | | |
| P8 | 29 | 0 | 2 |

Table V represents the address values of register 31 if during the first attempt, the first cycle results in a center bar pattern that is not one, but is one in the second cycle. This table then corresponds to Table III with the aforementioned exception. The cycle counter 61 will only be counted up to one at P2 time during the second cycle of the new attempt. By referring to Table II, it will be noted that at P8 time the cycle counter 61 will be reset if the retry counter 67 provides an even bit signal to AND gate 63. Since this is true under these conditions, the counter 61 is reset at P8 time to zero. Since a valid center bar pattern has not been located in memory, the sequence commences with sequence S1; see Table II. The search for a valid center bar pattern will now commence at memory address 29 and retry counter at 2.

TABLE VI

| Sequence | Memory Address | Cycle Counter 61 | Retry Counter 67 |
|---|---|---|---|
| P1 | 27 | 0 | 0 |
| S1 | 28 | 0 | 0 |
| S2 | 29 | 0 | 0 |
| S3 | 30 | 0 | 0 |
| ↓ | | | |
| ≈ | 30 | 0 | 0 |
| ↓ | | | |
| P2 | 30 | 1 | 0 |
| P3 | 30 | 1 | 1 |
| ↓ | | | |
| ≈ | 30 | 1 | 1 |
| ↓ | | | |
| P8 | 28 | 1 | 1 |
| S1 | 29 | 1 | 1 |
| S2 | 30 | 1 | 1 |
| S3 | 31 | 1 | 1 |
| ↓ | | | |
| ≈ | 31 | 1 | 1 |
| ↓ | | | |
| P2 | 31 | 0 | 1 |
| P3 | 31 | 0 | 2 |
| ↓ | | | |
| ≈ | 31 | 0 | 2 |
| ↓ | | | |
| P8 | 29 | 0 | 2 |

Table VI represents the values of the address register similar to Table V except the inverse relationship of the cycles. Table VI represents the address locations when an attempt for locating a valid center bar pattern results in a one during the first cycle, but not during the second cycle. During these assumed conditions, the cycle counter 61 will be counted up at P2 time during the first cycle only. As noted in Table II, during the second cycle at P2, the cycle counter is reset to zero. After completing this attempt, the search is repeated starting at memory locations 29 and the retry counter registering two.

Now referring to Table II, once again, it will be noted that if a valid center bar pattern has been located in memory at P4 time, that the sequence skips to P9 time. At P9 time, the recording or printing tolerance correction character computations commence. The sequencer 14S is preset to P9 since at P4 time an output signal is applied to the sequencer from AND gate 66. This signal results due to the decoding network 65 applying a "two" signal to the AND gate 66 which is read out at P4 time.

At P9 time, then, the correction computation commences on the basis of the width measurement stored at the address position denoted for step S1 in accordance with the location resulting in the valid search. If this occurs on the first attempt, the address location is 27, for example. The computations continue during steps P10 through P12 for the modules B, C and D. These computations are performed in the ratio computer 15 and will be described in conjunction therewith. The resulting character correction value is stored in the correction value register 100 of the character decoder 16 to be utilized during the decoding procedures to be described.

Now referring to FIG. 4, the general organization of the ratio computer 15 will be examined. The ratio computer 15 is utilized in conjunction with both the center bar locator 14 and the character decoder 16. The ratio computer 15 is operative on the data read out of the memory 13 for providing the necessary ratio computations and providing an output signal that is the logarithmn of the desired ratio to be used in either the center bar locator 14 or the character decoder 16. The data that is read out of the memory 13 and processed in the ratio computer 15 are width measurements representing the measured values for the modules A, B, C and D of a character. This A, B, C and D data is read out of the memory 13 and stored in individual storage registers A, B, C and D in the ratio computer 15. The data module that a register stores is identified in terms of the data read out from the register. Accordingly, the A module measurement is stored in the A register, and the B module measurement in the B register. The C module measurement is stored in the C register and the D module measurement in the D register. Each of the registers A, B, C and D have their inputs controlled by an individual AND circuit identified as AND circuits 70, 71, 72 and 73 respectively and are arranged left to right in FIG. 4. The data from the memory 13 is coupled in parallel circuit relationship to each of the AND circuits 70-73 as one input to each of these AND circuits. The AND circuit 70 is activated to store the A module measurement by means of the signal S1 from the center bar sequencer 14S. Similarly, the signals S2, S3 and S4 individually activate the respective AND gates 71, 72 and 73.

The output circuits for the registers A–D are controlled by means of one or two AND gates. The A register output circuit is controlled by means of the single two input AND gate 74, while the output circuit from the B register is controlled by means of two, two input AND gates 75 and 76. The output from the C register is controlled by a single AND gate 77, while the D register is controlled by means of a pair of AND gates 78 and 79. The second input to the AND gate 74 coupled to the A register is the output signal provided from the OR gate 80. The OR gate 80 is responsive to the input signals S5, S11, S17A and P9 which provide an output signal from the OR circuit 80 for reading out the data stored in the A register for further processing in the computer 15. Similarly, an OR gate 81 controls one of the input signals to the AND gate 75 for the B register. The OR gate 81 is responsive to the sequencing signals S13, S19B and P11. The output signals from the B register are applied in parallel circuit relationship as one input to both AND gates 75 and 76. The second input to the AND gate 76 is the S5 signal from the sequencer 14S. An OR gate 82 provides one of the input signals for the AND gate 77 for reading out the information out of the C register. The OR gate 82 is responsive to the sequencer signals S7, S13, S17C and P9. The sequencer signal S7 controls the transfer of the D register data through the AND gate 78. The D register data is coupled in parallel to both of the AND gates 78 and 79. An OR circuit 83 controls the input signal to the second input to the AND gate 79. The OR gate 83 is responsive to the sequencer signals S11, S19D and P11. The data stored in the registers A, B, C and D (and the memory 13) is not destroyed since a number of attempts may be required to decode the recorded symbol. The raw measurement data stored in the registers are merely read out for processing in the ratio computer 15. The data stored in the registers A, B, C and D is applied to a two input binary adder 84. One of the inputs to the adder 84 is controlled by an OR gate 85 and the other by an OR gate 86. The OR gate 85 is responsive to the output signals from the AND circuits 74, 75 and 78. The OR gate 86 is responsive to the output signals from the AND circuits 76, 77 and 79. The output signals from the adder 84 represent the linear sum of the width measurements of the two modules applied thereto or the sum of the signals presented to it by means of the OR gates 85 and 86.

The signal derived from the adder 84 is utilized to address a table stored in a read only memory identified as ROM A in FIG. 4. The data stored in ROM A is a conversion table that converts the linear sum signals to a binary coded decimal number that is the logarithmic value of the sum signal. A method for selecting the base for the logarithms is disclosed in the copending patent application bearing Ser. No. 638,056 and assigned to the same assignee as the present application, now U.S. Pat. No. 4,058,708. The disclosure of this copending application is incorporated herein by reference and resort to the teaching of said application Ser. No. 638,056 may be had if necessary to the understanding of the present invention. The sum signal is utilized as the address signal for reading out ROM A in accordance therewith. The signals read out of the ROM A are stored in a log register 87 coupled to receive the binary coded output signals from ROM A. The register 87 has an 8-bit capacity and is illustrated in FIG. 4 as having a left and right half, each storing four bits. The right half of the register stores the binary bits $2^0$ through $2^3$, while the left half stores the binary bits $2^4$ through $2^7$.

TABLE VII

| ROM A Address | Register 87 | |
| --- | --- | --- |
| | Left 4 Bits | Right 4 Bits |
| 7 | φ | φ |
| 8 | 1 | φ |
| 9–10 | 2 | 1 |
| 11–12 | 3 | 2 |
| 13 | 4 | 2 |
| 14 | 4 | 3 |
| 15–16 | 5 | 3 |
| 17 | 5 | 4 |
| 18–20 | 6 | 4 |
| 21–24 | 7 | 5 |
| 25 | 8 | 5 |
| 26–29 | 8 | 6 |
| 30–31 | 9 | 6 |
| 32–34 | 9 | 7 |
| 35–38 | 10 | 7 |
| 39–40 | 10 | 8 |
| 41–48 | 11 | 8 |
| 49–57 | 12 | 9 |
| 58–59 | 13 | 9 |
| 60–68 | 13 | 10 |
| 69–74 | 14 | 10 |
| 75–80 | 14 | 11 |
| 81–92 | 15 | 11 |
| 93–95 | 15 | 12 |
| 96–113 | φ | 12 |
| 114–115 | 1 | 12 |
| 116–135 | 1 | 13 |
| 136–143 | 2 | 13 |
| 144–160 | 2 | 14 |
| 161–179 | 3 | 14 |
| 180–190 | 3 | 15 |
| 191–223 | 4 | 15 |
| 224–225 | 4 | 0 |
| 226–255 | 5 | 0 |

It will be recalled that the minimum linear value selected for the counter 28 was seven and therefore values below seven need not be considered in Table VII. The logarithmic values represented in Table VII are arbitrarily initiated at zero and restart with zero after the value of 15 is reached. When the correction character is calculated, the ratios A/B or C/D are computed as $$\frac{(A + \phi)}{B + \phi} \text{ and } \frac{(C + \phi)}{D + \phi}.$$

The output signals from the two portions of the logarithm register 87 are controlled for further processing through the pair of AND gates 88 and 89. The left-hand portion of the register 87 has its output signals applied as an input to the AND gate 88, while the right-hand portion of the register 87 has its output signals applied as an input signal to the AND gate 89. The four bits comprising the input signals to the AND gates 88 and 89 represent the decimal values recorded in Table VII. An OR gate 90 controls the second input to the AND gate 88. The OR gate 90 is responsive to the signals from the sequencer 14S identified as S6, S8, S12, S14, S18 and S20. Similarly, an OR gate 91 controls the other input to the AND gate 89. The OR gate 91 is responsive to the sequencer signals P10 and P12. An OR gate 92 controls the application of the output signals from the AND gates 88 and 89 and is coupled thereto. The output signal from the OR gate 92 is coupled to a pair of AND gates 93 and 94 in parallel circuit relationship. The other input to the AND gate 93 is controlled by means of an OR circuit 95. The OR circuit 95 is responsive to the sequencer signals S6, S12, S18, and P10. An OR gate 96 controls the other input to the AND circuit 94. The OR gate 96 is responsive to the signals S8, S14, S20 and P12. The AND circuits 93 and 94 control the data that is entered into the individual log registers E and F, respectively. Each of the registers E and F are 4-bit registers for storing values of the logarithms of the sums of the measured widths, such as the logarithm of the sum A+B, for example. The registers E and F each have their output circuits coupled for transferring their contents to a subtractor 97. The subtractor 97 subtracts the logarithm of the two sums stored in the registers E and F, the register F value is subtracted from the register E value, and provides an output signal that is the log of the desired ratio signal. The subtractor 97 is enabled under the control of an OR gate 98. The OR gate 98 is responsive to the sequencer signals S9, S15, S21 and P13. The signal from the subtractor 97 is coupled to the center bar locator 14 or to the character decoder 16 in accordance with the use made of the ratio computer 15.

With the above structure of the ratio computer 15 in mind, the operation of the ratio computer will now be further examined. The information from the memory 13 representing the modules A, B, C and D are entered into the corresponding module registers in response to the generation of the sequencing signals S1, S2, S3 and S4 are delineated in Table II hereinabove. Once all of the A, B, C and D data is entered into the registers, the sequencing continues as indicated in Table II so that the A data and the B data are applied to the adder 84 to obtain the linear sum of these measured widths. This results due to the generation of the sequence signal S5 appearing as an input to the OR gate 80 for reading out the A register through the AND gate 74 and the OR gate 85. The same sequencing signal S5 transfers the B register data through the AND gate 76 and the OR gate 86 to the adder 84. The linear sum derived from the adder 84 addresses the ROM A to read out the logarithmic value of the sum and which sum is stored in the register 87. As noted in Table II, this data is transferred into the E register upon the generation of the S6 sequencing signal. The S6 sequencing signal provides an input signal to the AND gate 88 for transferring the data from the left half of the register 87 through the OR gate 92 and the AND gate 93 to the E register. It will be noted that the AND gate 93 is responsive to the output signal from the OR gate 92 in combination with the output signal from the OR gate 95 which latter gate produces the output signal in response to the reception of the S6 signal at its input.

The next sequence as noted in Table II is the generation of the S-7 signal and that signal is effective through OR gate 82, AND gate 77 and OR gate 86 to apply the "C" data to the adder 84. At the same time, The S7 signal transfers the D data from the D register to the AND circuit 78 and the OR circuit 86 to the other input to the adder 84. In the same fashion this data is transferred from the adder 84 by means of the ROM A and the logarithmic register 87 to the F register. The S8 sequence signal, as noted in Table II, will transfer the logarithmic value of the sum of the C and D data by means of the AND gate 88, the OR gate 92 and the AND gate 94. This results from the coupling of the S8 signal to the OR gate 90 and the OR gate 96 for activating the AND gates 88 and 94. Accordingly, at S9 time in the sequencing operation, the subtractor 97 is activated to subtract the data in the F register from that in the E register to provide the desired log of ratio signal from the subtractor 97.

Figure 5:
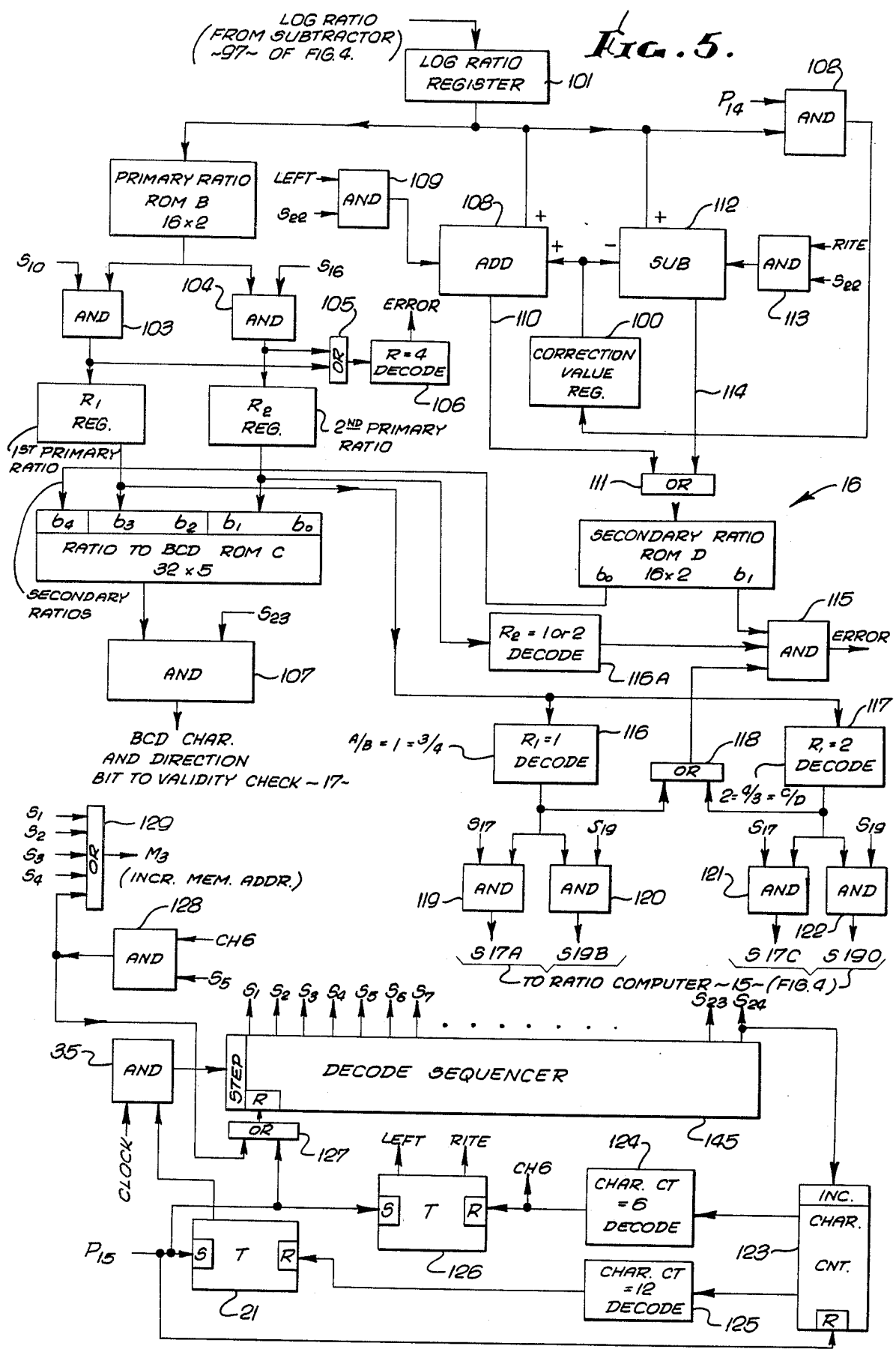
FIG. 5 is a schematic block diagram of the character decoder utilized in the system of FIG. 1.

Now referring to FIG. 5, the general organization of the character decoder 16 will be examined. The character decoder 16 as mentioned hereinabove operates in conjunction with the ratio computer 15 and receives the input signal from the ratio computer which is the logarithmn of the ratio computed and is stored in the log ratio register 101 for the character decoder 16. It will be recalled that during the operation of the ratio computer 15 in locating the center bar pattern that the printing error correction value was also calculated and transferred to the character decoder. It will be assumed that this value is stored in the correction value register 100 for the decoder 16. The correction value register 100 has the correction value entered therein under the control of the AND gate 102. The AND gate controls the input to the register 100 and has its input connected to the output of the log ratio register 101 and the signal P14 from the center bar locator sequencer 14S illustrated in FIG. 3.

TABLE VIII

| Sequence | Function |
|---|---|
| S1 | Load the A register and increment the memory address in register 31 |
| S2 | Load the B register and increment the memory address in register 31 |
| S3 | Load the C register and increment the memory address in register 31 |
| S4 | Load the D register and increment the memory address in register 31 |
| S5 | Select and add the contents of register A to the contents of register B with adder 84 |
| S6 | Load the log (A + B) into register E |
| S7 | Select and add the contents of register C to the contents of register D with adder 84 |
| S8 | Load the log (C + D) into register F |
| S9 | Subtract the contents of register F from the contents of register E with subtracter 97 |
| S10 | Translate log $\frac{A + B}{C + D}$ with ROM B and load the result into register R1 |
| S11 | Select and add the contents of register A to the contents of register D with adder 84 |
| S12 | Load log (A + D) into register E |
| S13 | Select and add the contents of register B to the contents of register C |
| S14 | Load log (B + C) into register F |
| S15 | Subtract the contents of register F from the contents of register E with subtracter 97 |
| S16 | Translate log $\frac{A + D}{B + C}$ with ROM B and load the result into register R2 |
| S17 | Select the contents of the A register (FIG. 4), if the R1 register is 1 select the contents of the C register (FIG. 4) if the R1 register is 2 |
| S18 | Load the value of log (A or C) into the E register (FIG. 4) |
| S19 | Select the contents of the B register (FIG. 4) if R1 equals 1, select the contents of the D register (FIG. 4) if R1 equals 2 |
| S20 | Load the value of log (B or D) into the F register |
| S21 | Subtract the contents of the F register from the contents of the E register by subtracter 97 |
| S22 | Combine the tolerance correction value to log $\frac{A}{B}$ or $\frac{C}{D}$ by adder 108 or subtracter 112 |
| S23 | Transmit the decoded character to validity check element 17 |
| S24 | Increment the character counter 173 and restart the sequence |

The table stored in ROM A comprehends the character correction resulting from printing the UPC symbol on a label or the like. Accordingly, the correction value is calculated in the ratio computer 15 after a valid center bar pattern is located and prior to decoding the characters of the symbol. The correction value is stored in the register 100 of the character decoder 16.

The correction value is computed in accordance with the present invention by examining the standard pattern having the known 1:1 ratio as to bars and spaces. For the purposes of decoding the UPC standard symbol the standard pattern that is examined is the center bar pattern widths. The correction value is obtained by measuring the actual or printed ratio of the center pattern bars and spaces. The ratio has been selected to include two bars and two spaces for minimizing the effects of local printing irregularities. In the standard UPC symbol, the ratio is defined by the two center bars over the two center spaces, or the ratio $$\frac{A + C}{B + D}.$$

For a nominal symbol these ratios will be one. For an over-printed symbol or label they will be greater than one and for an under-printed label they will be less than one. Stated differently, the ratio is defined by the widths of two dark bars over the widths of two light bars. Since the known ratio, or the width of a bar and space should be the same, any resulting ratio other than one will require a correction value to be combined with the stored, measured values of the modules A, B, C and D.

The correction computation in the sequence of events commences at P9 time by the reading out of the data for the two center bars from registers A and C. These width measurements are read out at P9 time by the P9 signal appearing at OR gate 80 and OR gate 82. They are applied to adder 84 through AND gate 74 and OR gate 85 and AND gate 77 and OR gate 86 respectively. The logarithmn of the resulting sum is read out of ROM A and stored in register 87. At P10 time, the register 87 has its contents transferred to the E register. This results from the signal P10 applied to the OR gates 91 and 95 which correspondingly activate AND gates 89, OR gate 92 and AND gate 93. Similarly, the B and D registers are read out at P11 time in the sequence. These width measurements are coupled to the input of adder 84 as a result of the P11 signal being coupled to the OR gate 81 and the OR gate 83. At P12 time, the log of the sum signal is transferred from register 87 to the F register. This results from the coupling of the P12 signal to OR gate 91 and OR gate 96. At P13 time, the subtractor 97 is enabled as a result of the P13 signal being coupled to the OR gate 98. The resulting logarithm of the correction signal is loaded into the correction value register 100 for the decoder 16 to be utilized for decoding by means of the aforementioned secondary ratios.

It should now be noted that the decode sequencer 14S illustrated in FIG. 5 is the same sequencer that is illustrated in FIG. 3 solely for the purpose of the center bar locator 14 and is merely duplicated in FIG. 5 to simplify the consideration of the operation of the decoder 16. It will be recognized by those skilled in the art that the sequencer could be time shared in a decoding system.

The log ratio register 101 output signals are applied to a primary ratio read only memory identified as the ROM B in FIG. 5. This ROM B stores a table for converting the logarithmic value of the ratios for the primary ratios generated during the decoding process or to a numerical valve representative of one of the primary ratios 4/3, 5/2, 2/5 or 3/4.

TABLE IX

| Address | Output Data | Data Ratio Value |
|---------|-------------|------------------|
| $\phi$  | 4           | (Error)          |
| 1-3     | 2           | Ratio = 4/3      |
| 4-8     | 3           | Ratio = 5/2      |
| 9-12    | $\phi$      | Ratio = 2/5      |
| 13-15   | 1           | Ratio = 3/4      |

Table IX relates the addresses of the ROM B to the output data for representing the primary ratios as indicated. It should be noted that when the output data of the ROM B is "2" the primary ratio is 4/3 and when the output data is "1" the primary ratio is 3/4.

The output data derived from ROM B is applied in a parallel circuit relationship to a pair of AND circuits 103 and 104. The AND circuit 103 is effective for transferring the ROM B output data therethrough in response to the S10 signal from the sequencer 14S. For this purpose, the output from the AND circuit 103 couples this data into the R1 register for storing the first primary ratio. Similarly, the AND circuit 104 is controlled by means of the signal S16 to transfer the ROM B output data to the R2 register. The R2 register will store the second primary decoding ratio. The output circuits from the AND circuits 103 and 104 are also applied to an OR circuit 105 for controlling a decoding circuit 106. The decoding circuit 106 indicates an error when a primary ratio data signal from ROM B is 4, as noted in Table IX.

The output signals of the registers R1 and R2 are coupled to a ratio to binary coded decimal ROM C. The data output signal of register R1 is applied to the $b_2$ and $b_3$ bits of ROM C, while the output signal of the R2 register is applied as the $b_0$ and $b_1$ bits of the ROM C.

TABLE X

| Secondary Ratio $b_0 = 0$ (1/2) | | | | | Secondary Ratio $b_0 = 1$ (2/1) | | | | |
|---------|----------|----------|------|---------|---------|----------|----------|------|---------|
| Address | R1 Value | R2 Value | Data | F/R Bit | Address | R1 Value | R2 Value | Data | F/R Bit |
| $\phi$  | $\phi$   | $\phi$   | 3    | 1       | 16      | $\phi$   | $\phi$   | 3    | 1       |
| 1       | $\phi$   | 1        | 4    | $\phi$  | 17      | $\phi$   | 1        | 4    | $\phi$  |
| 2       | $\phi$   | 2        | $\phi$ | 1     | 18      | $\phi$   | 2        | $\phi$ | 1     |
| 3       | $\phi$   | 3        | 6    | $\phi$  | 19      | $\phi$   | 3        | 6    | $\phi$  |
| 4       | 1        | $\phi$   | 5    | $\phi$  | 20      | 1        | $\phi$   | 5    | $\phi$  |
| 5       | 1        | 1        | 1    | 1       | 21      | 1        | 1        | 7    | 1       |
| 6       | 1        | 2        | 8    | $\phi$  | 22      | 1        | 2        | 2    | $\phi$  |
| 7       | 1        | 3        | 9    | 1       | 23      | 1        | 3        | 9    | 1       |
| 8       | 2        | $\phi$   | 5    | 1       | 24      | 2        | $\phi$   | 5    | 1       |
| 9       | 2        | 1        | 7    | $\phi$  | 25      | 2        | 1        | 1    | $\phi$  |
| 10      | 2        | 2        | 2    | 1       | 26      | 2        | 2        | 8    | 1       |
| 11      | 2        | 3        | 9    | $\phi$  | 27      | 2        | 3        | 9    | $\phi$  |
| 12      | 3        | $\phi$   | 3    | $\phi$  | 28      | 3        | $\phi$   | 3    | $\phi$  |
| 13      | 3        | 1        | 4    | 1       | 29      | 3        | 1        | 4    | 1       |

TABLE X-continued

| | Secondary Ratio $b_0 = 0$ (1/2) | | | | Secondary Ratio $b_0 = 1$ (2/1) | | | |
|---|---|---|---|---|---|---|---|---|
| Address | R1 Value | R2 Value | Data | F/R Bit | Address | R1 Value | R2 Value | Data | F/R Bit |
| 14 | 3 | 2 | $\phi$ | $\phi$ | 30 | 3 | 2 | $\phi$ | $\phi$ |
| 15 | 3 | 3 | 6 | 1 | 31 | 3 | 3 | 6 | 1 |

The stored contents of ROM C is in accordance with Table X. This table relates the two primary ratios and the secondary ratios to produce the desired character decoding in terms of the decoded decimal value as indicated in the data column and whether the data is a forward or a reverse read bit. The zero, $\phi$, bit identifies a forward number while a one, 1, bit identifies a reverse number. Forward is utilized in the sense illustrated in FIG. 1A of a left to right scan and reverse is a right to left scan. Both right and left characters decode as "forward" in a left to right scan and "reverse" in a right to left scan. The binary coded decimal output of the ROM C is applied to an AND circuit 107 which is controlled by means of signal S23 from the sequencer. The output of the AND circuit 107 is a binary coded decimal character having a direction bit which is coupled to the validity check circuit.

As will be recalled prior to generating the secondary ratio for decoding a character, the correction value character must be added or substracted to the measured widths for the modules A, B, C and D. In the left-hand portion of the label 10 the correction value is added to the measurement data and in the right half of the label, it is subtracted from this data. For this purpose, a binary adder 108 is provided for adding the information to the left-hand characters. The operation of the adder 108 is controlled by an AND gate 109. The AND gate 109 activates the adder 108 in response to a "left" signal and the S22 signal from the sequencer. The adder 108 combines the signals from the log ratio register 101 with the signal from the correction value register 100 and provides the corrected module data signal on the lead wire 110 to an OR circuit 111. Similarly, for the right half of the UPC symbol a subtracter 112 is provided. The subtracter 112 is enabled by means of an AND circuit 113 which is responsive to a "rite" signal and the S22 signal from the sequencer 14S. The subtractor 112 combines the data from the log ratio register 101 with the data from the correction value register 100 by subtracting the correction signal from the ratio signal. The corrected module value signal appears on a lead wire 114 that is applied as a second input to the OR circuit 111. The output signal of the OR circuit 111 is applied for addressing the secondary ratio ROM D.

TABLE XI

| Address | Output Data | Data Ratio Value |
|---|---|---|
| $\phi$-1 | 2 | Error |
| 2-7 | 1 | Ratio = 2/1 |
| 8 | 2 | Error |
| 9-14 | $\phi$ | Ratio = 1/2 |
| 15 | 2 | Error |

The contents of the secondary ratio ROM is represented in Table XI. The output signals of the ROM D define whether the ratio A/B or C/D is 2/1 or 1/2 for the purposes of resolving the ambiguity. The outputs of the secondary ratios ROM D are identified as $b_0$ and $b_1$ outputs. If the $b_0$ output from the ROM D is 1, the ratio is 2/1 and if the $b_0$ output is zero, the ratio is 1/2. Other output signals are the $b_1$ signals and all have the value two to denote a decoding error; see Table XI. The $b_1$ output signal from the ROM D is coupled as an input signal to an AND circuit 115. A second input to the AND circuit 115 is provided by the output signal from the element 116A further identified as the $R_2$ equals 1 or 2 element. The input signal for the element 116A is coupled from the output of the R2 register. The $b_0$ ROM output signal is coupled to the $b_4$ bit of the ROM C.

For the purpose of resolving any ambiguity, it is necessary to select one of the two desired secondary ratios in accordance with whether the first primary ratio, or the ratio stored in the R1 register is 3/4 or 4/3. To this end, the output of the R1 register is coupled to a pair of decoding elements 116 and 117 for storing the R1 value for decoding purposes. When the decoding element 116 signals that the R1 register equals 1, the primary ratio is 3/4 and the selected secondary ratio is A/B. When the decode register 117 signals that the R1 register equals 2, the primary ratio is 4/3 and the selected ratio is C/D; see FIG. 1C. Each of the output circuits for the decode registers 116 and 117 are applied as input signals to an OR gate 118. The output of the OR gate 118 is coupled as the third input to the AND circuit 115. Accordingly, when R1 equals 2 or 1 and R2 equals 2 or 1, and the $b_1$ signal of two appears at the AND circuit 115, an error will be signalled from the AND circuit 115. The output signals from each of the decode registers 116 and 117 are coupled in a parallel circuit relationship to an individual pair of AND circuits 119 and 120 and 121 and 122 respectively. The AND circuit 119 is responsive to the S17 signal and the R1 decode so that it produces a signal identified as the S17A signal at its output which is coupled to the ratio computer 15. Similarly, the other input to the AND circuit 120 is responsive to the S19 input signal for producing the output signal S19B to the ratio computer 15. The AND circuit 121 and the AND circuit 122 are each responsive to the output of the decode register 117 in parallel circuit relationship. The AND circuit 121 is also responsive to the S17 sequencer signal to produce the output signal S17C. Similarly, the AND circuit 122 is responsive to the S19 signal to produce the S19D signal which is coupled to the ratio computer 15.

Since the character decoding unit 16 decodes both the left-hand and right-hand UPC symbol in sequences through the 6 left-hand (0-5) characters normally, at character 6 time the center bar pattern commences and would be decoded. To prevent decoding the central pattern, the memory address is advanced 5 positions. The decoding may then commence at the first right-hand character. For this purpose a character counter 123 is provided which counts the characters as they are sequentially decoded in response to each of the S24 signals from the sequencer. The counter 123 provides an output to decode register 124 for indicating that 6 characters have been decoded. This unit 124 is further identified as the character count=6 decode. Similarly, a second register 125 is responsive to the 12th count of the counter 123 to indicate that the symbol has been completely decoded. The decode register 124 provides a CH6 signal for resetting the toggle element 126 to produce the "rite" signal. The decode register 125 has its output applied to the reset terminal of the toggle 21. The toggle 21 has its set terminal coupled to be responsive to the P15 signal from the center bar sequencer 14S illustrated in FIG. 3. The setting of the toggle 21 provides a signal to the AND circuit 35. The P15 signal is also applied to reset the character counter 123 and to set the toggle 126. The setting of the toggle 126 provides the "left" signal to the AND circuit 109. The P15 signal is also coupled to the OR circuit 127 for resetting the decode sequencer 14S (FIG. 5). The sequencer 14S is controlled as in the previous sequencer by means of the AND circuit 35 coupling the clock pulses to the stepping input of the sequencer in response to the "set" state of the toggle 21. The OR circuit 127 is also provided with an input signal from the AND circuit 128 for resetting the sequencer. The AND circuit 128 is responsive to the CH6 signal from the decoding register 124 and the S5 sequencing circuit. The output of the AND circuit 128 is also coupled to the OR circuit 129 for providing a signal M3 for incrementing the memory address. The OR circuit 129 for this purpose is also responsive to the S1, S2, S3 and S4 sequencing signals for incrementing the memory address of the other four positions.

With the above structure of the character decoder 16 in mind, the step-by-step operation can now be examined. The sequential operation will be examined in conjunction with Table VIII. Initially, it will be recalled that during the center bar locating sequence that the correction value for correcting the measured widths of the modules was generated. Accordingly, at the P14 time in the center bar locating sequence, the AND gate 102 for the character decoder 16 was activated and the logarithm of the tolerance correction character from the register 101 was transferred into a correction value register 100 prior to the actual character decoding operation commencing. At the P15 time in the center bar locating sequence the control of the system was transferred from the center bar locater 14 to the character decoder 16 so that the decoding of the character of the UPC symbol will commence; see Table II.

At this point, the logic for making the correction to the measured widths of the modules should be understood. For both a forward and reverse scan of the UPC symbol, the tolerance correction character or value is added to the measured modules widths for those modules in the left-hand field of the symbol and is subtracted from the measured widths in the right-hand field. In a reverse scanning operation, the correction is made before inverting the reverse scanned characters. This logic applies when the correction value has been computed from a bar/space ratio.

Since the character decoder 16 is dependent upon the ratio computer 15, certain operations for the purposes of decoding are identical to those required for locating the center bar pattern; see Table VIII. Accordingly, the initial sequencing steps S1–S9 are identical to those disclosed in conjunction with the operation of the center bar locator 14 for producing the desired logarithm of the decoding ratios that are stored in the register 101. Accordingly, after the S9 sequencing step occurred, the primary ratio computation, log $$\frac{A+B}{C+D}$$

is transferred from the ratio computer 15 to the decoder 16. This logarithmic signal addresses the ROM B and provides a numerical output signal representative of the primary ratio in accordance with Table IX. At S10 time in the sequence, the data read out of the ROM B is stored in the R1 register. Similarly, during the sequence steps S11–S16, the second primary ratio is generated in the ratio computer 15 and transferred to the register 101 of the decoder 16. This second primary ratio log signal represents the ratio $$\frac{A+D}{B+C}.$$

At the end of S16 time, the data read out of ROM B is stored in register R2.

With both primary decoding ratios generated and residing in registers R1 and R2, the decision as to which secondary ratio is to be utilized for the purposes of resolving the ambiguity must take place; see FIG. 1C. The ratio A/B or C/D is computed during each decoding operation whether or not it is required. For this purpose, the contents of decode registers 116 and 117 are examined to determine if the first primary ratio is 3/4 or 4/3. The data stored in the registers 116 and 117 is in accordance with Table IX. It should now be noted that if the data signal stored in either register 116 or 117 is four (R1 or R2 is four) an ERROR signal is generated and the control of the system is returned to the center bar locator 14. An ERROR signal is generated by the OR gate 118 sensing the "four" stored in the register 116 or 117 and providing an input signal to the AND gate 115. The $b_1$ signal from ROM D will be true when it signals a "two" as indicated in Table XI.

If there is no error at this point, the selection of the correct secondary decoding ratio will continue in accordance with sequence step S17. If the register 116 signals that R1 is equal to 1, the ratio is 3/4 (Table IX) and then the A module is selected or the A register in the ratio computer 15 is interrogated. For this purpose, the decoder 16 generates a signal S17A in response to the S17 sequencing step for reading out the contents of the A register in the ratio computer 15 by means of the OR circuit 80 and the AND circuit 74; and the OR circuit 85 to the adder 84 of the ratio computer. If the register 117 signals that R1 is equal to 2 then the ratio is 4/3 (Table IX), the ratio computer 15 receives an S17C signal during the S17 sequence and which S17C signal is applied to the OR circuit 82 and enables the AND circuit 121. This will read the data out of the C register in the ratio computer 15 through the OR circuit 82, the AND circuit 77 and the OR circuit 86 to the adder 84. At step S18, the logarithm signal of the measured module width A or C, in accordance with the previous selection is loaded into the E register of the ratio computer 15. The same procedure occurs at sequencing time S19 to read out either the B register or the D register to the adder 84 in accordance with whether R1 is 1 or 2. At step S20 the resulting logarithm signal for the modules B or D is loaded into the F register of the ratio computer 15. At S21 time, the contents of register F is subtracted from the contents of register E to provide the log of the ratio signal in the register 101. At S22 time, the tolerance correction value previously stored in register 100 is added or subtracted in accordance with whether the left-hand or the right-hand field characters are being decoded.

If the correction value is to be added to the measured width, the logical conditions for this addition must be satisfied. At P15 time of the center bar locating sequence, the toggle 126 was "set" for providing a "LEFT" output signal that is in the true state. This "LEFT" signal is coupled to the AND gate 109 and upon the occurrence of the S22 time the adder 108 is enabled. The contents of the log ratio register 101 is added to the contents of the correction value register 100 and the corrected module width signal appears on the lead wire 110 and is coupled to the OR gate 111.

If the correction value is to be subtracted to the measured module width, the logical conditions for a subtraction must be satisfied. Assuming an initial forward scan, after the left-hand field has been decoded, the character counter 123 has been counted up to six. This six count is decoded by the character six decoding network 124 to provide an output signal indicative of the six counts. This output signal is coupled to the reset input of the toggle 126 to produce a "RITE" output signal that is in the TRUE state. This RITE signal is coupled to the AND gate 113 and upon the occurrence of the signal S22, the subtractor 112 is enabled. The contents of the correction value register 100 is subtracted from the contents of the log ratio register 101 and the corrected module width signal appears on the lead wire 114 and is coupled to the OR gate 111.

When a corrected module width signal for either a left-hand or a right-hand field appears at the input of OR gate 111, the output signal thereof addresses the secondary decoding ratio ROM D. The signals read out of ROM D are in accordance with Table XI. With the secondary ratio data read out of ROM D, the data signals representative of a valid 2/1 or 1/2 secondary ratio is applied to the bit 4 ($b_4$) position of the ROM C along with the data from the R1 and R2 registers. The R1 data is applied to the $b_2$ and $b_3$ positions of ROM C and the R2 data to the $b_0$ and $b_1$ positions thereof. The contents of the ROM C corresponds to the data represented in Table X. In relating this Table data to the circuit operation of the character decoder 16, it will be noted that since the secondary ratio value is applied to the highest order address bit or position of ROM C, the characters that do not require a secondary ratio to be unambiguously decoded appear twice in ROM C. For these characters the secondary ratio is a "don't care" bit and can be ignored.

The values recorded in Tables I and X can be readily translated to reveal the decoding of the recorded characters in terms of the primary and secondary ratios. If the primary ratios decode to 2/5 and 3/4, the decoded character is defined solely by these two primary ratios and the character is unambiguously a forward 4, Table I and address 1 in Table X. If the two primary ratios are 3/4, 3/4, a secondary ratio must be examined as a reverse 7 or a reverse 1 may result; Table I. If the secondary ratio of A/B results in the ratio 2/1, a reverse 7 is decoded. Similarly, if the secondary ratio is 1/2, reverse 1 is unambiguously decoded.

The Table X contents relate the $b_0$–$b_4$ address positions of ROM C for both a forward and reverse scan and the secondary ratios of 1/2 and 2/1. The "Address" column of Table X represents the decimal equivalent of the binary coded bits $b_0$–$b_4$. The bits $b_0$–$b_3$ will have the values 0,1,2, or 3 for a valid primary ratio as noted in Table IX. The $b_4$ bit will be either 1 or 0 for a valid secondary ratio as noted in Table XI. The F/R column of Table X identifies whether the decoded data character is a forward or reverse bit. The $\phi$ symbol signifies a forward bit and the 1 a reverse bit.

At the S23 sequence, the addressed memory location in ROM C is coupled through AND gate 107 to produce the binary coded decimal decoded character having the direction bit as discussed hereinabove. At this time, the output signal from the AND gate 107 is transmitted to the validity check circuit 17. The remaining step in the decoding procedure is S24. The S24 signal increments the character counter 123 to the count of twelve. This 12th character is decoded in the unit 125, which signals a "12" output signal. With the register 125 signalling that the 12th character has been decoded, the toggle 21 is reset to disable the AND gate circuit 35 and thereby the decoder sequencer 14S. The character decode sequence may now be restarted.

The characters that are decoded in accordance with Table X must be consistent either for a forward or reverse scan. This effectively satisfies the parity check requirements referred to in the UPC standard symbol specifications. To provide a valid, decoded output there must be twelve valid characters and the check digit must verify. If the read direction indicators are not consistent and the check digit test fails, control is returned to the center bar locator 14 to attempt to find another position.

In following through the operation of the system various conditions have been mentioned herein, wherein an invalid decoding operation may return the control to the center bar locator 14 to reexamine the memory for a valid center bar pattern. In addition, it has been noted that a read will be aborted when the retry counter 67 has been counted up to ten (5 attempts and 2 cycles per attempt). Other conditions that will abort the read are:

(1) If any of the data from the wand 11 provides module width measurements that when added together or summed (A+B, C+D,---) overflow 8 bits cause an aborted read.

(2) If any of the character ratios or A/B or C/D ratios fall into the regions marked "Error" in Tables IX and XI the read is aborted in addition to the conditions noted in Table II.

It should be appreciated by those skilled in the art that the circuit elements described herein are well known in the art and commercially available thereby permitting the system to be constructed on the basis of the above disclosure. The element functions that have been repeated herein for purposes of explanation can be performed by a single element that may be time shared in an operational system.

The improvement disclosed herein has advanced the state of the art with respect to reading and decoding a high density, linear bar code of the type of the standard Universal Product Code symbol and derivatives thereof that permit decoding ambiguities to be simply resolved and is highly tolerant to manual accelerations and of recording or printing tolerances. The improvement is directly applicable to high speed laser scanners as well as portable, battery operated hand-held scanners.

What is claimed is:

1. A method of reading a delta distance coded segment having coding modules of the type of the Universal Product Code including the steps of unambiguously decoding the information containing coding modules of the coded segment on the basis of measuring the relative widths of preselected coding modules exhibiting delta distance properties to obtain two primary ratios of the selected delta distances to thereby decode the segments, and in the event a coded segment may not be unambiguously decoded by the first step, examining the ambiguously decoded segment for producing the ratio of the widths of a pair of preselected coding modules thereof that do not exhibit delta distance properties to define secondary ratios for unambiguously decoding the coded segment by the use of the two primary decoding ratios and one of the secondary ratios, the pair of preselected coding modules utilized in the second decoding step for defining a secondary ratio being selected from the coding modules utilized for the first decoding step in defining one of the primary ratios on the basis of the width relationships of a preselected one of the two primary ratios resulting from the first decoding step.

2. A method of reading a delta distance coded segment having coding modules of the type of the Universal Product Code including the steps of decoding the information containing coding modules of the coded segment on the basis of determining the ratios of the sums of the widths of preselected coding modules exhibiting delta distance properties for unambiguously identifying the individual coded characters represented thereby, and further producing a ratio of the widths of a pair of preselected coding modules that do not exhibit delta distance properties to generate a predetermined ratio of 2/1 or the inverse of the predetermined ratio of 1/2 for any coded character that has not been unambiguously decoded through said first decoding step and resolving the ambiguity by selecting the resulting ratio of one of said pair of preselected coding modules of 2/1 or 1/2.

3. A method of reading a coded segment as defined in claim 2 including the step of determining if the widths of the coding modules of a coded segment have been recorded within certain preselected tolerances and in the event the coding modules are out of tolerance, correcting the measured widths of the coding modules for decoding the coded segment unambiguously with the corrected measured widths.

4. A method of reading a delta distance coded segment having coded modules of the type utilized in the Universal Product Code including the steps of measuring the widths of the coded modules of a coded segment exhibiting delta distance properties, for determining a pair of primary ratios of the sums of preselected widths of the coded modules, examining the pair of ratios to determine if a pair of ratios are 3/4 and 4/3 in combination, decode any segment not determined to include said pair of ratios, examining the ratios of the widths of a certain pair of coding modules for the ratio 2/1 or 1/2 in accordance with whether a preselected primary ratio is 3/4 of 4/3, respectively, and decoding any segment determined to include the primary ratios of 3/4 and 4/3 along with one of the resulting ratios 2/1 or 1/2.

5. A method of reading a delta distance coded segment recorded on a surface consisting of a group of coding modules having preselected widths with successive modules having different characteristics for representing characters and a constant width reference, each coded character having a group of coding modules having a known ratio between successive coding modules included with each coded segment, the method including the steps of measuring the widths of each coding module of a coded segment, producing a pair of primary ratios proportional to the sums of the widths of preselected ones of the coding modules exhibiting delta distance properties whereby a pair of primary ratios uniquely define a coded character except for certain coded characters, producing a ratio of preselected coding modules of the group of modules having said known ratio for providing a recording tolerance correction character in the event of a deviation from the known ratio is produced, correcting the measured widths of each coding module in accordance with the tolerance correction character, and decoding said certain characters identified by their production of a certain pair of primary ratios by examining the ratio of the corrected widths of a pair of coding modules to provide a secondary decoding ratio, the pair of coding modules being selected on the basis of the value of the primary ratio produced for said certain characters whereby the primary and one of the secondary ratios uniquely define each of said certain characters.

6. A method of reading a delta distance coded segment recorded on a surface consisting of a group of coding modules having preselected widths with successive segments having different characteristics for representing characters and a constant width reference, each coded character having a group of coding modules having a known ratio between successive coding modules included with each coded segment, said method including the steps of measuring the widths of each coding module of a coded segment, storing the measured widths of each coding module in successive storage locations in a storage device, computing the ratios of two preselected pairs of widths of the coding modules exhibiting delta distance properties for providing a pair of primary decoding ratios, examining the resulting pair of primary decoding ratios to determine if the coded segment may be unambiguously decoded soley on the basis of the primary decoding ratios, computing a recording tolerance correction character on the basis of the measured widths of the group of modules having a known ratio prior to recording resulting from the recording of the coded segment, correcting the measured widths of each coding module in accordance with the recording tolerance correction character, and if the examination of the pair of primary decoding ratios results in an ambiguity, computing a secondary decoding ratio for resolving the ambiguity on the basis of the ratio of the corrected, measured widths of two preselected, sequentially recorde coding modules, the preselected coding modules being selected on the basis of the value of the ratio of one of said primary decoding ratios whereby the segment is unambiguously decoded soley on the basis of the values of the pair of primary ratios or on the basis of the pair of primary ratios and one of the secondary ratios.

7. A method of reading a delta distance coded segment recorded on a surface as defined in claim 6 wherein the step of computing the primary ratios includes the logarthmic computation of the ratios.

8. A method of reading a delta distance coded segment recorded on a surface as defined in claim 7 wherein the steps of computing the recording tolerance correction character and the secondary decoding ratio includes the logarithmic computation of the ratios.

9. A method of reading a delta distance coded segment recorded on a surface as defined in claim 6 wherein the coded segment is recorded with a central portion having a group of coding modules having a known ratio between successive coding modules and a group of coding modules recorded on opposite sides of the central portion of the segment each representing a character, and including the step of examining the widths of the coding modules stored in the storage device for locating the position of the central group of coding modules and thereby locating the coding modules on opposite sides thereof, after locating the central group of coding modules, computing the primary decoding ratios in accordance with the remaining steps of claim 6.

10. A method of reading a delta distance coded segment recorded on a surface as defined in claim 6 wherein the widths of each coding module is electronically measured on the basis of a linear time base and the sums of the widths of preselected ones of the coding modules are added linearly for obtaining the linear sums thereof, and including providing a look-up table for converting the sums to a value representative of the logarithmic values of the sums, looking up the logarithmic values of the sums of the coded segments for defining the pair of primary ratios, subtracting the logarithmic values of the sums of the coded segments for producing the logarithmic value of the two primary ratios, and providing a second look-up table for converting the logarithmic values of the primary ratios to obtain the numerical values of the ratios in the decimal system.

11. A method of reading a delta distance coded segment recorded on a surface as defined in claim 6 wherein the computation of the secondary decoding ratios includes the step of looking up the logarithmic values of the measured widths of the two preselected coding modules for defining the secondary decoding ratio, and subtracting the resulting logarithmic values for obtaining the logarithmic value of the secondary ratio and then converting the logarithmic value by means of the second look-up table to the numerical value of the secondary ratio in the decimal system.

12. A method of reading a delta distance coded segment recorded on a surface consisting of a group of coding modules having preselected widths with successive segments having different characteristics for representing characters and a constant width reference, each coded character having a group of coding modules having a known ratio between successive coding modules included with each coded segment, said method including the steps of measuring the widths of each coding module of a coded segment, storing the widths of each coding module in successive storage locations in a storage device as they are measured, computing the sums of the widths of preselected pairs of the coding modules exhibiting delta distance properties, computing the ratios of preselected pairs of sums for providing a pair of primary ratios that uniquely define a coded character except for certain coded characters, producing a ratio of preselected coding modules of the group of modules having said known ratio for providing a recording tolerance correction character in the event a deviation from the known ratio is produced as a result of recording the coded segment, in the event of a deviation from the known ratio is produced correcting the measured widths of each coding module in accordance with the recording tolerance correction character, and computing a secondary ratio for said certain coded character of preselected ones of the corrected coding modules for said certain characters, the preselected ones of the modules being selected in accordance with the value of one of the primary ratios produced for said certain character whereby said characters are uniquely defined by the resulting primary and one of the secondary ratios produced.

13. A method of reading a delta distance coded segment as defined in claim 12 wherein the step of computing the sum of the widths is a linear addition and the step of computing the ratios includes a logarithmic computation.

14. A method of decoding a delta distance coded segment recorded on a surface, the segment comprising groups of coding modules having preselected widths with successive modules having different characteristics for representing a character and a constant width reference, including the steps of unambiguously decoding the information coding modules of the coded segment on the basis of first and second primary decoding ratios computed on the basis of the widths of each coding module exhibiting delta distance properties representing a character, in the event a coded segment may not be unambiguously decoded by the first step, examining the ambiguously decoded segment for computing a secondary decoding ratio based on the widths of a preselected pair of successive coding modules when the second primary decoding ratio is the inverse ratio of the first primary decoding ratio, the selected pair of successive modules being selected on the basis of the value of the first primary ratio whereby a first pair of successive coding modules is selected when the first primary ratio has a first value and the second pair of successive coding modules is selected that do not include the first pair of successive modules when the first primary ratio has a second value that is the inverse value of the first primary ratio value for defining the secondary decoding ratio, and unambiguously decoding the segment producing an ambiguity on the basis of said first and second primary decoding ratios and one of the thus defined second decoding ratios.

15. A method of decoding a delta distance coded segment recorded on a surface as defined in claim 14 including computing a recording tolerance correction character on the basis of the recorded widths of the coding modules relative to the standard width for the coding modules to correct any deviation from the standard resulting from recording the segment, correcting the recorded widths of the coding modules with the computed correction character, and then computing the secondary decoding ratio on the basis of the corrected, recorded widths of a pair of coding modules.

16. A method of reading a delta distance coded segment recorded on a surface, the segment comprising a group of four coding modules comprising two dark bars and two light spaces of different widths for representing each coded character, the method including the steps of electronically measuring the widths of each of the four coding modules of a coding segment representing a character, storing the measured widths of each of the four coding modules in a read/write memory element, computing a first preselected ratio of the sum of the widths of a first pair of modules stored in the memory element relative to the sum of the widths of a second pair of modules stored in the memory element, the widths of the pair of modules summed representing delta distances on the coding segment, the ratio computation including a logarithmic computation of the ratio for defining a first primary decoding ratio, computing a second preselected ratio of the sum of the widths of a third pair of modules stored in the memory element relative to the sum of the widths of a fourth pair of modules stored in the memory element, the widths of the pair of modules summed representing delta distances on the coding segment, the ratio computation including a logarithmic computation of the ratio for defining a second primary decoding ratio, computing a secondary decoding ratio based on the widths of a preselected pair of successive coding modules of said four modules when the value of the second primary decoding ratio is the inverse of the value of the first primary decoding ratio, the selected pair of successive modules being selected on the basis of the value of the first primary ratio whereby a first successive pair is selected when the first primary ratio has a first value and the second successive pair not including the first successive pair is elected when the first primary ratio has a second value that is the inverse of the first value for defining the secondary decoding ratio, and unambiguously decoding a coded character on the basis of the first and second primary ratios only or the first and second primary ratios and one of the resulting secondary decoding values.

17. A method of decoding a coded segment recorded on a surface by a portable, manually operated scanning element, the segment comprising groups of coding modules having preselected widths with successive modules having different characteristics for representing a character, the sequence of the modules and their widths being unique for each character, the method including the steps of producing relative motion between a coded segment and a manual scanning element for producing electrical signals representative of the pattern of coding modules comprising the coded segment and any recorded data associated therewith, electronically processing the resulting pattern of electrical signals as they are produced for producing electrical data signals representative of the scanned widths of each coding module comprising a coded segment without decoding the resulting data signals, storing all of the data signals in a storage device in the sequence that they were scanned, without decoding the data signals, locating all of the stored data signals solely representing each of the coding modules of a coded segment in the storage device, and electronically processing the located module data signals in terms of their relative widths for unambiguously decoding the coded segment.

18. A method of decoding a coded segment recorded on a surface as defined in claim 17 wherein the step of electronically processing includes the step of determining if any out of tolerance conditions exist for the coded segments and then correcting the stored widths of the data signals representative of the widths of the coding modules for correcting for any out of tolerance recording thereof, and utilizing the corrected module data width signals during the decoding processing thereof.

19. A method of decoding a delta distance coded segment recorded on a surface by a portable, manually propelled segment scanning element, the segment comprising groups of coding modules having preselected widths with successive modules having different characteristics for representing a character and a constant width reference, the method including the steps of producing relative motion between a coded segment and a manual scanning element for producing electrical signals representative of the pattern of coding modules comprising the coded segment, electronically processing and storing the resulting pattern of electrical signals for producing electrical data signals representative of the scanned width of each coding module comprising a coded segment, computing first and second primary decoding ratios on the basis of the scanned and stored widths of each coding module of a coded segment representing a character, the decoding ratios being computed on the basis of delta distances on the coded segments, unambiguously decoding the decoded segment on the basis of the computed first and second primary decoding ratios, and in the event a coded segment decoded by the aforementioned steps resulting in an ambiguity, computing a secondary decoding ratio based on the widths of a preselected pair of successive coding modules when the second primary decoding ratio is the inverse ratio of the first primary decoding ratio, the selected pair of successive coding modules being selected on the basis of the value of the first primary ratio whereby a first pair of successive coding modules are selected when the first primary ratio has a first value and the second pair of successive coding modules, not including the first pair, is selected when the first primary ratio has a second value that is the inverse value of the first value for defining the secondary decoding ratio, and decoding the segment producing the ambiguity on the basis of said first and second primary decoding ratios and one of the thus computed secondary ratios.

20. A method of decoding a delta distance coded segment recorded on a surface as defined in claim 19 wherein the coded segment has coding modules of different optical characteristics, and the scanning element is a hand-held manually propelled optical scanning element that is manually moved over the coded segment to be scanned.

21. A method of decoding a delta distance coded segment recorded on a surface as defined in claim 19 wherein the successive coding modules of a coded segment are identified as modules A, B, C and D and the secondary decoding ratio computed on the basis of the ratio of the modules A/B or C/D.

22. A method of decoding a delta distance coded segment recorded on a surface as defined in claim 21 wherein the first primary decoding ratio is based on the ratio $$\frac{A + B}{C + D}$$

and the second primary decoding ratio is based on the ratio $$\frac{A + D}{B + C}$$

wherein the sums of the coding modules represent the linear sum of the scanned widths of the coding modules.

23. A method of decoding a delta distance coded segment recorded on a surface, the segment comprising groups of coding modules having preselected widths with successive modules having different characteristics for representing a character and a constant width reference, the sequence of the coding modules and their relative widths being unique for each character, the segment including a group of coding modules arranged in a known sequence and having a known ratio between successive coding modules prior to recording, the method including the steps of electronically measuring the widths of each coding module comprising the coded segment and storing all of the signals representative of the widths of each coding module comprising the coded segment without decoding, electronically examining the group of stored module signals having said known ratio for any width errors resulting from recording the coded segment on a surface relative to the desired known ratio, in the event a width error is detected in the coding module widths as recorded, correcting the measured width signals in accordance with the errors determined from examining the coding modules having the widths of a known ratio, and processing the corrected module width signals for unambiguously decoding the coded segment.

24. A method of decoding a delta distance coded segment recorded on a surface as defined in claim 23 wherein the successive coding modules representative of a coded character and the group of coding modules having a known ratio are sequentially identified as the A, B, C, and D modules, and the step of correcting the measured width signals includes the step of processing the coding modules having the known ratio by processing the ratio of the sums of the widths of the coding modules $$\frac{A + C}{B + D}$$

wherein the A and C are coding modules having one and the same characteristic and B and D are coding modules having one and the same characteristic that is different than the characteristic of A and C for determining the magnitude of the correction, if any, that is required.

25. A method of decoding a delta distance coded segments printed on a surface, the segment comprising groups of coding modules having preselected widths with successive modules having different characteristics for representing a character, the sequence of the modules and their widths being unique for each character, the coded segment including a group of coding modules having known widths and with successive modules exhibiting different characteristics and a 1:1 ratio, said latter group of coding modules being centrally arranged on the coded setment with a group of coding modules arranged on opposite sides thereof and each representing a coded character, the method including the steps of manually scanning the coded segment for producing electrical signals representative of all of the printed coding modules, electronically processing the electrical signals for deriving electrical signals representative of the widths of the coding modules including the modules arranged centrally of the coded segment, storing each of the module width signals in a memory in sequential storage locations in the order the segment was scanned, searching the memory for locating the storage locations of the central group of coding modules to locate the group on the basis of their known widths, to thereby locate the storage locations of the character encoding modules on the opposite sides thereof, and decoding the character coding modules.

26. A method of decoding a delta distance coded segment recorded on a surface as defined in claim 25 wherein the central group of coding modules is located when a sequential group of coding modules are determined to have their known widths.

27. A method of decoding a delta distance coded segment printed on a surface as defined in claim 26 wherein the central group of coding modules is located with a sequential group of four coding modules are determined to have the known ratio of 1:1.

28. A method of decoding a delta distance coded segment recorded on a surface as defined in claim 26 wherein the central group of coding modules is located when a sequential group of four coding modules stored at address n, n+1, n+2, and n+3 are determined to have the 1:1 ratio and the next successive group of four coding modules stored at address n+1, n+2, n+3 and n+4 are also determined to have a ratio of 1:1.

29. A method of decoding a delta distance coded segment recorded on a surface as defined in claim 25 including the step of examining the central group of coding modules, once located, relative to the known ratio to determine if the printing of the coded segment on the surface has produced printing errors in the module widths, and in the event printing errors are determined to exist, correcting the module width signals in accordance with the error determined, and then decoding the corrected module width signals.

30. Apparatus for reading and decoding a recorded delta distance coded segment comprising a group of coding modules having preselected widths with successive modules having different characteristics for representing a character and a constant width reference, the apparatus including means for reading the coded segment and providing electrical signals representative of the coding modules without decoding any of the coding modules comprising the segment, and electronic processing means including addressable electrical signal storing means for storing the coded module signals provided by said reading means for utilization by the processing means coupled to be operative on the module signals for unambiguously decoding the module signals after they are all read.

31. Apparatus for reading and decoding a recorded, delta distance coded segment as defined in claim 30 wherein the coded segment comprising modules having different optical reflective characteristics and each coded segment includes at least a preselected arrangement of two groups of modules of one kind and two groups of modules of another kind with each group of modules having different widths and arrangements for representing different characters and said reading means comprises optical reading means for providing the electrical signals representative of the coding modules.

32. Apparatus for reading and decoding a recorded, delta distance coded segment as defined in claim 31 wherein said optical reading means comprises a portable optical reading wand.

33. Apparatus for reading and decoding a recorded, delta distance coded segment as defined in claim 32 wherein the apparatus is a portable battery operated apparatus and the reading wand is a manually operated hand-held optical scanning wand.

34. A method of decoding a delta distance coded segment recorded on a surface as defined in claim 30 wherein the coded segment is of the type of the Universal Product Code standard coding symbol.

35. Apparatus for reading and decoding a recorded, delta distance coded segment as defined in claim 34 wherein the coded segment is the Universal Product Code standard coding symbol and said electronic processing means decodes the symbol on the basis of computing primary decoding ratios of 2/5, 3/4, 4/3 and 5/2 and the secondary decoding ratio of 2/1 or 1/2 in accordance with whether a preselected primary decoding ration is 3/4 or 4/3, respectively.

36. A method of decoding a delta distance coded segment recorded on a surface as defined in claim 35 wherein the processing means includes addressable, read/write signal storage means for storing the coding module signals in the storage means in successive storage locations as they are read and computing means for computing the primary and secondary decoding ratios.

37. Apparatus for reading and decoding a recorded delta distance coded segment as defined in claim 36 wherein the computing means includes logarithmic computing means.

38. Apparatus for reading and decoding a recorded, delta distance coded segment as defined in claim 36 wherein the logarithmic computing means comprising read-only memory means for storing tables for converting electrical signals to a preselected logarithmic base.

39. Apparatus for reading and decoding a recorded, delta distance coded segment comprising a group of modules having preselected widths with successive modules having different characteristics for representing a character, the apparatus including means for reading the coded segment and providing electrical signals representative of the coding modules without decoding the segment, electronic processing means for electronically generating module data signals representative of the widths of the coding modules, means coupled to said processing means for computing preselected ratio signals for decoding the coded segments on the basis of the module widths, said computing means including means for linearly combining preselected module widths signals exhibiting delta distance properties and means for logarithmically combining the linear combinations of said width signals for defining a pair of primary decoding ratio signals and a pair of secondary decoding ratio signals, and means for decoding the coded segment in accordance with the primary decoding ratio signals and one of the secondary decoding ratio signals.

40. Apparatus for reading and decoding a recorded, delta distance coded segment as defined in claim 39 wherein the decoding means utilizes one of the two secondary decoding ratio signals in accordance with the resulting value of a preselected one of the primary decoding ratio signals.

41. Apparatus for reading and decoding a recorded group of information bearing coding modules having preselected widths for representing a character, the group of modules including a group of noninformation bearing coding modules with successive modules having different characteristics having a known width ratio between each of the successive modules within the group, said apparatus including means for reading the coded segments and providing electrical signals representative of the measured widths of each of the coded segments, signal storage means coupled to said reading means for storing each of the module width signals without decoding in successive storage locations in the order the coded segments are read, means for searching the storage means for locating the group of noninformation bearing coding modules having said known width ratios between modules, means for examining and determining if the group of noninformation bearing coding modules exhibit the known width ratio, computing means coupled to said examination means for computing a correction signal in the event the known ratio is not present to correct the information bearing signals to said known ratio, means coupled to said storage means for correcting the measured width signals for the information bearing modules with said correction signal, and means for decoding the corrected information bearing module width signals.

42. Apparatus for reading and decoding a recorded, coded segment as defined in claim 41 wherein the successive coding modules have different optical characteristics and said reading means comprises optical reading means.

43. Apparatus for reading and decoding a recorded group of information bearing cording modules as defined in claim 42 wherein the optical reading means comprises a portable optical reading means that is utilized for manually reading the coding modules.

44. Apparatus for reading and decoding a recorded, coded segment as defined in claim 41 wherein the successive coding modules are identified as the modules A, B, C, D and the examining means determines the presence of the known ratio by examining the module width ratio $$\frac{(A + C)}{(B + D)}$$

wherein modules A and C are one kind of module and modules B and D are the other kind of module.

45. Apparatus for reading and decoding a recorded group of information bearing modules as defined in claim 106 wherein the group of noninformation bearing cording modules are identified as the modules A, B, C, D and E and a valid, known ratio for the group is only identified upon the group of modules exhibiting the known ratio when the examining means examines the two module width ratios $$\frac{(A + C)}{(B + D)} \text{ and } \frac{(B + D)}{(C + E)}$$

and each exhibits the known ratio, wherein the modules A, C and E are one kind of module and modules B and D are the other kind of module.

46. Apparatus for reading a printed group of information bearing coding modules having preselected widths with successive modules having different optical characteristics for representing a character, the group of modules including a group of noninformation bearing coding modules with successive modules having different optical characteristics but with a known width ratio between each of the successive modules within the group, the apparatus including
- means for reading the coding modules and providing electrical signals representative of the measured widths of each of the coding modules, without decoding the coding modules,
- means for storing the measured widths for each of the coding modules without decoding,
- means for examining the group of noninformation bearing coding modules stored in said latter mentioned means to determine if the coding modules have been erroneously printed including exhibiting an out of tolerance printing condition, said means examines the coding modules to determine if they exhibit the known ratio and if not, signals the magnitude and direction of any printing error on the basis of the resulting deviation from the known ratio,
- means for correcting the coding module electrical signals in accordance with the signals from said examining means to bring them within preselected printing tolerances, and
- means for unambiguously decoding the corrected coding module electrical signals.

47. Apparatus for reading a printed group of information bearing coding modules as defined in claim 46 wherein the group of information bearing coding modules are printed on opposite sides of a group of noninformation bearing coding modules and the correction means corrects the coding module electrical signals for each group of information bearing coding modules prior to any processing of the signals for decoding the modules.

48. Apparatus for reading a printed group of information bearing coding modules as defined in claim 47 wherein the correction means includes means for computing a correction character for modifying the measured width signals, the correction character being divided or multiplied by the measured ratio between the successive modules of the noninformation bearing group of modules, the information bearing modules having the correction character multiplied therewith being the first group of modules encountered in the direction of reading and the other group of modules having the correction character divided therewith.

49. Apparatus for reading a printed group of information bearing coding modules as defined in claim 48 wherein said computing means comprises logarithmic computing means wherein a logarithmic value other than zero signals a printing error and the degree of printing deviation is signalled by the magnitude of the logarithmic value.

50. Apparatus for reading a printed group of information bearing coding modules as defined in claim 49 wherein said computing means includes logarithmic means for adding and subtracting the correction character to the measured widths to effect the necessary corrections.

51. Apparatus for reading and decoding a printed group of information bearing coding modules having preselected widths with successive modules having different optical characteristics for representing a character, the group of modules including a series of noninformation bearing coding modules with successive coding modules having different optical characteristics but with a known width ratio between each of the successive modules with said series of modules, a group of information bearing coding modules being arranged on opposite sides of the series of noninformation bearing modules, the apparatus comprising
- means for reading the coding modules and providing electrical signals representative of the measured widths of each of the coding modules without decoding the coding modules,
- an addressable read/write memory means,
- means for storing the electrical width signals for each of the coding modules in individual, addressable locations within the memory means in the same sequence in which they are read,
- means for searching the stored width signals for determining the location in the memory means of the series of noninformation bearing coding modules and thereby the locations of the information bearing coding modules, said means including computing means for examining the stored width signals to determine the valid location of the series of signals having the known width ratios, said means further including computing means for computing a correction signal in the event the series of coding modules exhibit an out of tolerance printed condition and computing a corrected module width signal for the information bearing coding modules, and
- means for decoding the corrected information bearing coding modules based on the location in the memory means of the location of said series of coding modules.

52. Apparatus for reading and decoding a printed group of information bearing coding modules as defined in claim 51 wherein the information bearing coding modules are identified as the A, B, C and D modules successively and the decoding means decodes the information bearing coding modules by generating the two primary decoding ratios of $$\left(\frac{A+B}{C+D}\right) \text{ and } \left(\frac{A+D}{B+C}\right)$$

and a secondary decoding ratio of A/B and C/D, one of the secondary decoding ratios is selected for decoding purposes in accordance with the resulting value of the primary ratio $$\left(\frac{A+B}{C+D}\right),$$

the selected secondary decoding ratio being generated upon the basis of the corrected module width signals.

53. Apparatus for reading and decoding a printed group of information bearing coding modules as defined in claim 52 wherein a valid series of signals having the known width ratios are examined upon the basis of the ratio $$\left(\frac{A+B}{C+D}\right)$$

at address locations n, n+1, n+2, n+3 and again at address locations n+1, n+2, n+3 and n+4 and signalling a valid series only if both examinations exhibit the known ratio.

54. Apparatus for reading and decoding a printed group of information bearing coding modules as defined in claim 53 wherein said width correction computing means processes the correction signal by combining the signal with the measured module width signals in one manner for the coding modules on one side of the series of noninformation coding modules and in an opposite manner for the coding modules on the opposite side of said series.

55. Apparatus for reading and decoding a printed group of information bearing coding modules as defined in claim 54 wherein said reading means comprises optical reading means for providing electrical signals representative of the coding modules.

56. Apparatus for reading and decoding a printed group of information bearing coding modules as defined in claim 54 wherein said optical reading means comprises a portable, optical reading means.

57. Apparatus for reading and decoding a printed group of information bearing coding modules as defined in claim 54 wherein the group of coding modules are representative of the standard Universal Product Code symbol coding modules.

58. Apparatus for reading and decoding a printed group of information bearing coding modules as defined in claim 57 wherein the apparatus comprises direct current power means and the optical reading means comprises a manually operated reading wand.

59. Apparatus for reading and decoding a printed group of information bearing coding modules as defined in claim 58 wherein the computing means includes logarithmic computing means.

60. Apparatus for reading and decoding a printed group of information bearing coding modules as defined in claim 59 wherein the logarithmic computing means comprises read-only memory means for storing prselected tables for converting between the decimal number system and logarithmic values.

* * * * *

UNITED STATES PATENT OFFICE
CERTIFICATE OF CORRECTION

Patent No. 4,354,101          Dated   Oct. 12, 1982

Inventor(s)  Gerald P. Hester and Paul Sherer

It is certified that error appears in the above-identified patent and that said Letters Patent are hereby corrected as shown below:

Column 16, line 52, "indentified" should be -- identified --
Column 23, line 29, "are" should be -- as --

Column 40, Claim 25, line 15, "setment" should be -- segment --
Column 42, Claim 43, line 63, "cording" should be -- coding --
Column 43, Claim 45, line 12, "106" should be -- 44 --
Column 43, Claim 45, line 13, "cording" should be -- coding --
Column 46, Claim 60, lines 32 and 33, "prselected" should be -- preselected --

Signed and Sealed this

Tenth   Day of   May 1983

[SEAL]

Attest:

GERALD J. MOSSINGHOFF

Attesting Officer       Commissioner of Patents and Trademarks